US009047840B2

(12) United States Patent
Koyama et al.

(10) Patent No.: US 9,047,840 B2
(45) Date of Patent: Jun. 2, 2015

(54) DISPLAY DEVICE AND ELECTRONIC APPLIANCE

(75) Inventors: Jun Koyama, Sagamihara (JP); Shunpei Yamazaki, Setagaya (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 363 days.

(21) Appl. No.: 13/159,593

(22) Filed: Jun. 14, 2011

(65) Prior Publication Data

US 2011/0316818 A1 Dec. 29, 2011

(30) Foreign Application Priority Data

Jun. 25, 2010 (JP) ................................ 2010-144883
Jun. 25, 2010 (JP) ................................ 2010-145143

(51) Int. Cl.
*G06F 3/038* (2013.01)
*G09G 5/00* (2006.01)
(Continued)

(52) U.S. Cl.
CPC ............ *G09G 3/3666* (2013.01); *G09G 3/3413* (2013.01); *G09G 3/342* (2013.01); *G09G 3/3659* (2013.01); *G09G 2310/0235* (2013.01); *G09G 2310/024* (2013.01);
(Continued)

(58) Field of Classification Search
CPC ... G09G 3/3413; G09G 3/342; G09G 3/3659; G09G 3/3666
USPC .................................................. 345/102, 204
See application file for complete search history.

(56) References Cited

U.S. PATENT DOCUMENTS

| | | | |
|---|---|---|---|
| 5,421,576 | A | 6/1995 | Yamazaki et al. |
| 5,735,741 | A | 4/1998 | Yamazaki et al. |
| 6,290,601 | B1 | 9/2001 | Yamazaki et al. |

(Continued)

FOREIGN PATENT DOCUMENTS

| | | |
|---|---|---|
| CN | 101297347 | 10/2008 |
| JP | 06-059885A U | 8/1994 |

(Continued)

OTHER PUBLICATIONS

Invitation to pay additional fees (Application No. PCT/JP2011/063857) , International Searching Authority, Dated Jul. 12, 2011.

(Continued)

*Primary Examiner* — Kwang-Su Yang
(74) *Attorney, Agent, or Firm* — Eric J. Robinson; Robinson Intellectual Property Law Office, P.C.

(57) ABSTRACT

Included are a display panel including first to third pixel regions and a driver circuit; a backlight portion divided into a first light source region where light is emitted in response to input of a video signal to the first pixel region, a second light source region where light is emitted in response to input of a video signal to the second pixel region, and a third light source region where light is emitted in response to input of a video signal to the third pixel region; a video signal selection circuit used to supply the video signals from plural memory circuits to the driver circuit; a control circuit that supplies a control signal for controlling the driver circuit; a sequence determination circuit that supplies a backlight control signal and a selection signal; and a random number generation circuit used for selection from colors in the sequence determination circuit.

32 Claims, 21 Drawing Sheets

(51) Int. Cl.
*G09G 3/36* (2006.01)
*G09G 3/34* (2006.01)

(52) U.S. Cl.
CPC ................. *G09G 2310/0297* (2013.01); *G09G 2320/0242* (2013.01); *G09G 2360/16* (2013.01)

(56) References Cited

U.S. PATENT DOCUMENTS

| | | | | |
|---|---|---|---|---|
| 6,386,976 | B1 | 5/2002 | Yamazaki et al. | |
| 6,448,951 | B1 * | 9/2002 | Sakaguchi et al. | 345/88 |
| 6,570,554 | B1 | 5/2003 | Makino et al. | |
| 6,597,348 | B1 | 7/2003 | Yamazaki et al. | |
| 7,125,334 | B2 | 10/2006 | Yamazaki et al. | |
| 7,161,573 | B1 | 1/2007 | Takatori et al. | |
| 7,317,438 | B2 | 1/2008 | Yamazaki et al. | |
| 7,336,322 | B2 | 2/2008 | Kobori et al. | |
| 7,385,579 | B2 | 6/2008 | Satake | |
| 7,403,177 | B2 | 7/2008 | Tanada et al. | |
| 7,652,648 | B2 | 1/2010 | Takatori et al. | |
| 7,702,705 | B2 | 4/2010 | Suzuki | |
| 7,724,340 | B2 * | 5/2010 | Kang et al. | 349/150 |
| 7,773,066 | B2 | 8/2010 | Yamazaki et al. | |
| 7,791,571 | B2 | 9/2010 | Ohtani et al. | |
| 7,834,830 | B2 | 11/2010 | Yamazaki et al. | |
| 7,855,770 | B2 | 12/2010 | Egi et al. | |
| 7,941,471 | B2 | 5/2011 | Katz et al. | |
| 2004/0059517 | A1 * | 3/2004 | Szajnowski | 702/18 |
| 2006/0038761 | A1 * | 2/2006 | Shen et al. | 345/92 |
| 2007/0279374 | A1 | 12/2007 | Kimura et al. | |
| 2008/0273006 | A1 * | 11/2008 | Hong | 345/102 |
| 2009/0231324 | A1 * | 9/2009 | Kotani et al. | 345/214 |
| 2010/0039450 | A1 * | 2/2010 | Lin et al. | 345/690 |
| 2010/0149084 | A1 * | 6/2010 | Chida | 345/102 |
| 2010/0235418 | A1 | 9/2010 | Dong et al. | |
| 2010/0321420 | A1 | 12/2010 | Ohtani et al. | |
| 2011/0001725 | A1 | 1/2011 | Kurokawa | |
| 2011/0025729 | A1 | 2/2011 | Yamazaki et al. | |
| 2011/0051034 | A1 | 3/2011 | Egi et al. | |

FOREIGN PATENT DOCUMENTS

| | | | | |
|---|---|---|---|---|
| JP | 11-258573 | A | 9/1999 | |
| JP | 11-337904 | A | 12/1999 | |
| JP | 2001-133746 | A | 5/2001 | |
| JP | 2005-295347 | A | 10/2005 | |
| JP | 2006-178126 | A | 7/2006 | |
| JP | 2006-220685 | | 8/2006 | |
| JP | 2006-220685 | A | 8/2006 | |
| JP | 2007-114628 | A | 5/2007 | |
| JP | 2007-264211 | A | 10/2007 | |
| JP | 2009-042405 | A | 2/2009 | |
| KR | 2008-0063286 | A | 7/2008 | |
| WO | WO-2006/067750 | | 6/2006 | |
| WO | WO-2007/049489 | | 5/2007 | |
| WO | WO 2007/049489 | A1 * | 5/2007 | G09G 3/36 |

OTHER PUBLICATIONS

Taira, K. et al., "A 15" Field-Sequential Display without Color Break-Up using an AFLC Color Shutter," IDW '00, Proceedings of The Seventh International Display Workshops, pp. 73-76 (2000).

Kurita, T. et al., "Evaluation and Improvement of Picture Quality for Moving Images on Field-sequential Color Displays," IDW '00, Proceedings of The Seventh International Display Workshops, pp. 69-72 (2000).

Järvenpää, T. "Measuring Color Breakup of Stationary Images in Field-Sequential-Color Displays," SID 04 Digest, vol. 35, pp. 82-85 (2004).

Baron, P. C. et al., "Can Motion Compensation Eliminate Color Breakup of Moving Objects in Field-Sequential Color Displays?" SID 96 Digest, vol. 27, pp. 843-846.

* cited by examiner

DISPLAY DEVICE AND ELECTRONIC APPLIANCE

TECHNICAL FIELD

The present invention relates to liquid crystal display devices and methods for driving the liquid crystal display devices. In particular, the present invention relates to field-sequential liquid crystal display devices and methods for driving the field-sequential liquid crystal display devices.

BACKGROUND ART

A color filter method and a field sequential method are known as display methods for liquid crystal display devices. In a color-filter liquid crystal display device, a plurality of subpixels which has color filters each transmitting only light having wavelengths exhibiting a given color (e.g., red (R), green (G), or blue (B)) are provided in each pixel. A desired color is expressed in such a manner that transmission of white light is controlled in each subpixel and a plurality of colors is mixed in each pixel. On the other hand, in a field-sequential liquid crystal display device, a plurality of light sources that emits light of different colors (e.g., red (R), green (G), and blue (B)) is provided. A desired color is expressed by sequential light emission of the plurality of light sources that emit light of different colors and control of transmission of light of different colors in each pixel.

A field sequential method has the following advantages over a color filter method. First, in a field-sequential liquid crystal display device, it is not necessary to provide subpixels in each pixel. Thus, the aperture ratio can be improved or the number of pixels can be increased. In addition, in a field-sequential liquid crystal display device, it is not necessary to provide a color filter, which leads to no loss of light due to absorption of light by a color filter. Thus, in the case of such a field-sequential liquid crystal display device, transmittance can be increased and power consumption can be reduced.

Patent Document 1 discloses a field-sequential liquid crystal display device. Specifically, Patent Document 1 discloses a liquid crystal display device in which each pixel includes a transistor that controls input of a video signal, a signal storage capacitor that stores the video signal, and a transistor that controls transfer of charge from the signal storage capacitor to a display pixel capacitor. In the liquid crystal display device having this structure, input of a video signal to the signal storage capacitor and display corresponding to charge held in the display pixel capacitor can be performed at the same time.

REFERENCE

[Patent Document 1] Japanese Published Patent Application No. 2009-042405

DISCLOSURE OF INVENTION

In a field-sequential liquid crystal display device, the frequency of input of a video signal to each pixel needs to be increased. For example, in a field-sequential liquid crystal display device which includes light sources of three colors (red (R), green (G), and blue (B)) in a backlight, the frequency of input of a video signal to each pixel needs to be more than or equal to three times as high as that in a color-filter liquid crystal display device which includes a light source of white light in a backlight. Specifically, in the case where the frame frequency is 60 Hz, it is necessary to input video signals to each pixel 60 times per second in a color-filter liquid crystal display device; in contrast, it is necessary to input video signals to each pixel 180 times per second in a field-sequential liquid crystal display device which includes light sources of three colors (red (R), green (G), and blue (B)).

Field-sequential liquid crystal display devices have been known to have a peculiar problem of color breakup (also referred to as color breaking). When the frequency of input of a video signal is increased, color breakup is suppressed; however, another problem such as necessity of improvement in response characteristics of a switching operation of a transistor comes to the surface.

In view of the above, an object of one embodiment of the present invention is to suppress color breakup caused in the case of a field sequential method without improving response characteristics of a switching operation of a transistor.

One embodiment of the present invention is a field-sequential liquid crystal display device including a display panel, a backlight portion, a video signal selection circuit, a control circuit, a sequence determination circuit, and a random number generation circuit. The display panel includes a first pixel region; a second pixel region; a third pixel region; and a driver circuit that inputs video signals to pixels in the first pixel region, the second pixel region, and the third pixel region simultaneously. The backlight portion includes light sources of plural colors; and a backlight control circuit. The light sources of plural colors are divided into a first light source region where light is emitted to the first pixel region in response to input of the video signal to the first pixel region, a second light source region where light is emitted to the second pixel region in response to input of the video signal to the second pixel region, and a third light source region where light is emitted to the third pixel region in response to input of the video signal to the third pixel region. The backlight control circuit controls the light sources of the plural colors so that the light sources of the plural colors in the first light source region, the second light source region, and the third light source region emit lights of different colors. The video signal selection circuit includes plural memory circuits each storing one of the video signals of the plural colors and is used to supply the video signal from the memory circuit to the driver circuit. The control circuit supplies a control signal for controlling the driver circuit. The sequence determination circuit supplies a backlight control signal to the backlight control circuit and a selection signal to the video signal selection circuit, in accordance with the control signal supplied from the control circuit to the driver circuit. The random number generation circuit is used for selection from the colors in the sequence determination circuit.

Another embodiment of the present invention is a field-sequential liquid crystal display device including a display panel, a backlight portion, a video signal selection circuit, a control circuit, a sequence determination circuit, and a random number generation circuit. The display panel includes a first pixel region; a second pixel region; a third pixel region; and a driver circuit that inputs video signals to pixels in the first pixel region, the second pixel region, and the third pixel region simultaneously. The backlight portion includes light sources of plural colors; and a backlight control circuit. The light sources of plural colors are divided into a first light source region where light is emitted to the first pixel region in response to input of the video signal to the first pixel region, a second light source region where light is emitted to the second pixel region in response to input of the video signal to the second pixel region, and a third light source region where light is emitted to the third pixel region in response to input of the video signal to the third pixel region. The backlight control circuit controls the light sources of the plural colors so that the light sources of the plural colors in the first light source region, the second light source region, and the third light source region emit lights of different colors. The video signal selection circuit includes plural memory circuits each storing one of the video signals of the plural colors and is used to supply the video signal from the memory circuit to the driver circuit. The control circuit supplies a control signal for controlling the driver circuit. The sequence determination circuit supplies a backlight control signal to the backlight control circuit and a selection signal to the video signal selection circuit, in accordance with the control signal supplied from the control circuit to the driver circuit. The random number generation circuit generates a chaotic random number and is used for selection from the colors in the sequence determination circuit.

In a field-sequential liquid crystal display device according to another embodiment of the present invention, plural colors of light sources may be red, green, and blue.

In a field-sequential liquid crystal display device according to another embodiment of the present invention, in a period in which a color image is displayed when light sources of plural colors emit lights, the light sources of the plural colors in a first light source region, a second light source region, and a third light source region may emit lights of different colors.

In a field-sequential liquid crystal display device according to another embodiment of the present invention, light sources of plural colors may emit no light before and after the period in which a color image is displayed when the light sources of the plural colors emit lights.

In a field-sequential liquid crystal display device according to another embodiment of the present invention, plural pixels may be electrically connected to any one of the signal lines provided for columns.

In a field-sequential liquid crystal display device according to another embodiment of the present invention, plural pixels may be supplied with scan signals from plural shift registers that are used to simultaneously scan lines provided for rows.

In a field-sequential liquid crystal display device according to one embodiment of the present invention, color breakup can be suppressed without improving response characteristics of a switching operation of a transistor.

BRIEF DESCRIPTION OF DRAWINGS

In the accompanying drawings:

FIGS. 20A to 20E2 are cross-sectional views according to embodiments of the present invention.

BEST MODE FOR CARRYING OUT THE INVENTION

Figure 1:
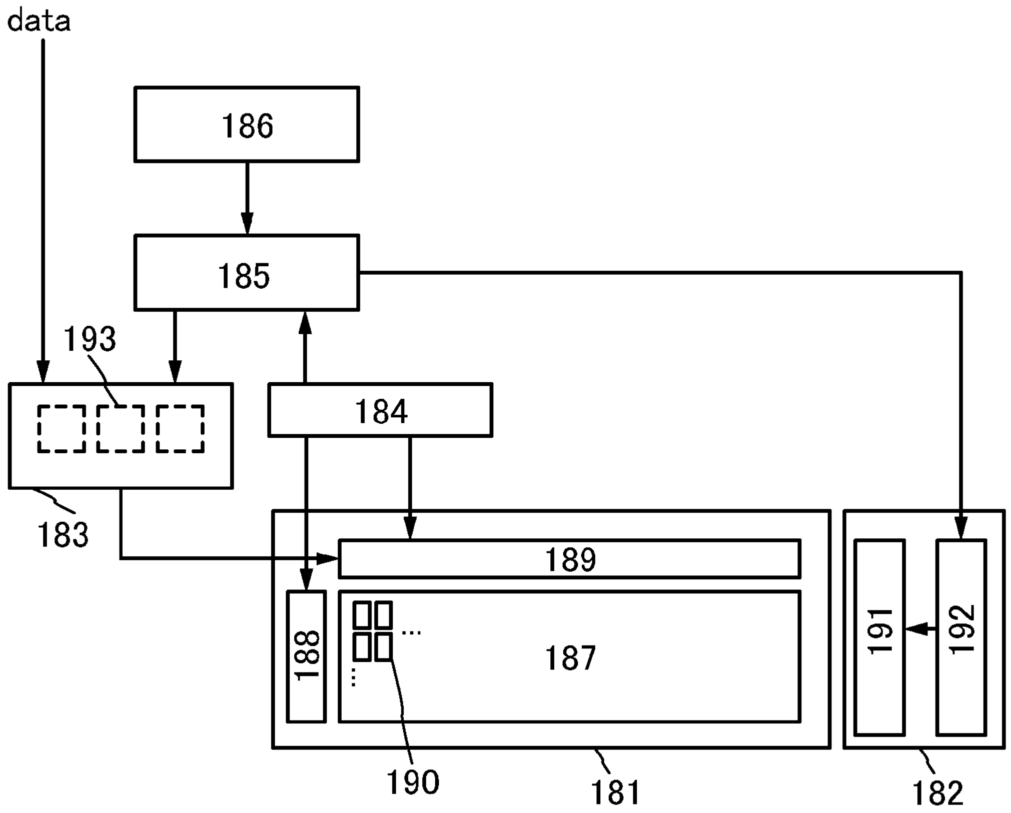
FIG. 1 is a block diagram according to one embodiment of the present invention.

Hereinafter, embodiments of the present invention will be described with reference to the drawings. Note that the present invention can be carried out in many different modes, and it is easily understood by those skilled in the art that modes and details of the present invention can be modified in various ways without departing from the spirit and the scope of the present invention. Therefore, the present invention should not be construed as being limited to the following description of the embodiments. Note that identical portions or portions having the same function in all drawings illustrating the structure of the present invention that are described below are denoted by the same reference numerals.

Note that the size, the thickness of a layer, the waveform of a signal, and a region of each structure illustrated in the drawings and the like in the embodiments are exaggerated for clarity in some cases. Therefore, the embodiments of the present invention are not limited to such scales.

Note that in this specification, terms such as “first”, “second”, “third”, and “N-th” (N is a natural number) are used in order to avoid confusion among components and do not limit the components numerically.

Embodiment 1

First, FIG. 1 is a block diagram illustrating a liquid crystal display device. The liquid crystal display device in FIG. 1 includes a display panel 181, a backlight portion 182, a video signal selection circuit 183, a control circuit 184, a sequence determination circuit 185, and a random number generation circuit 186.

The display panel 181 includes a pixel portion 187, a scan line driver circuit 188, and a signal line driver circuit 189. The pixel portion 187 includes a plurality of pixels 190. Each of the pixels 190 includes a transistor serving as a circuit portion that selects a pixel, a pixel electrode connected to the transistor, and a capacitor. Note that a liquid crystal element is formed in such a manner that a liquid crystal layer is sandwiched between the pixel electrode and an electrode paired with the pixel electrode. To the scan line driver circuit 188 and the signal line driver circuit 189, control signals for operating the driver circuits (e.g., a clock signal, a start pulse, and the like) are supplied from the control circuit 184. To the signal line driver circuit 189, a selected video signal is supplied from the video signal selection circuit 183.

When the pixels 190 are divided into a plurality of regions, for example, a first pixel region, a second pixel region, and a third pixel region, the scan line driver circuit 188 and the signal line driver circuit 189 which are the driver circuits input video signals to the pixels in the first pixel region, the second pixel region, and the third pixel region at the same time.

Note that when it is explicitly described that "A and B are connected," the case where A and B are electrically connected, the case where A and B are functionally connected, and the case where A and B are directly connected are included therein. Here, the phrase "A is electrically connected to B" means, when an object having an electric function is placed between A and B, the case where a portion between A and B, which includes the object, can be considered as a node.

Specifically, the description "A and B are connected" includes the case where a portion between A and B can be regarded as one node in consideration of circuit operation, for example, the case where A and B are connected through a switching element such as a transistor and have the same or substantially the same potentials by conduction of the switching element, and the case where A and B are connected through a resistor and the potential difference generated at opposite ends of the resistor does not adversely affect the operation of a circuit including A and B.

The backlight portion 182 includes light sources 191 of a plurality of colors (e.g., red (R), green (G), and blue (B)) for color display, and a backlight control circuit 192 that controls light emission of the light sources 191. The luminances of the light sources of red (R), green (G), and blue (B) are independently controlled by the backlight control circuit 192. The sequence determination circuit 185 controls the backlight control circuit 192 in order to control the sequence of light emission of the light sources of red (R), green (G), and blue (B). In FIG. 1, the backlight portion 182 and the display panel 181 are arranged side by side; however, the backlight portion 182 is actually provided so as to overlap with the display panel 181.

The light sources 191 are divided into, for example, a first light source region, a second light source region, and a third light source region. In the first light source region, light is emitted to the first light source region in response to input of a video signal to the first pixel region. In the second light source region, light is emitted to the second pixel region in response to input of a video signal to the second pixel region. In the third light source region, light is emitted to the third pixel region in response to input of a video signal to the third pixel region. The first to third light source regions include light sources of a plurality of colors for color display, red (R), green (G), and blue (B) here. The backlight portion 182 is controlled so that the light sources of red (R), green (G), and blue (B) in the first to third light source regions emit lights of different colors from one another.

Note that the combination of colors of the light sources 191 of a plurality of colors for color display may be different from the combination of red (R), green (G), and blue (B) (RGB). As the light sources 191, it is only necessary to use light sources of a plurality of colors for color display; thus, it is possible to use the combination of RGB to which another color is added, the combination of colors other than RGB, or the like.

The video signal selection circuit 183 includes a plurality of memory circuits (image memories) 193 that stores video signals (data in FIG. 1) for the plurality of colors of the light sources 191 in the backlight portion 182. When the plurality of colors for color display is red (R), green (G), and blue (B) (RGB), the video signal selection circuit 183 includes a memory circuit that stores a video signal for expressing red color, a memory circuit that stores a video signal for expressing green color, and a memory circuit that stores a video signal for expressing blue color.

A video signal is preferably a digital video signal so as to be stored in the plurality of memory circuits 193 included in the video signal selection circuit 183. A video signal may be an analog video signal as long as the analog video signal is converted into a digital video signal by an A/D converter circuit. The sequence determination circuit 185 selects any one of video signals of the plurality of colors of the light sources 191, which are stored in the plurality of memory circuits 193 in the video signal selection circuit 183, and the selected video signal is output to the signal line driver circuit 189. The memory circuit 193 may be formed using a memory element such as a dynamic random access memory (DRAM) or a static random access memory (SRAM).

The control circuit 184 is a circuit that supplies control signals (a clock signal and a start pulse signal) for operating the scan line driver circuit 188 and the signal line driver circuit 189 in the display panel 181, and a signal for starting control of the sequence of selection of the video signals stored in the memory circuit 193 by the sequence determination circuit 185, in synchronization with the control signals.

The sequence determination circuit 185 is a circuit that selects any one of the video signals of the plurality of colors of the light sources 191, which are stored in the plurality of memory circuits 193 in the video signal selection circuit 183, in each frame period on the basis of a signal from the random number generation circuit 186 (also referred to as a random number signal) and controls the selected video signal so that it is output to the signal line driver circuit 189. The backlight control circuit 192 is a circuit that controls the sequence of light emission of the light sources of red (R), green (G), and blue (B) in accordance with a video signal selected in the video signal selection circuit 183.

The random number generation circuit 186 is a circuit that generates a random number and outputs a random number signal corresponding to the random number to the sequence determination circuit 185. A random number may be a pseudorandom number which can be obtained by a mixed congruential method, a middle-square method, or the like on the basis of an appropriate initial value.

In the random number generation circuit 186, actually, a microcomputer actually performs calculation to generate a random number signal. Thus, the random number generation circuit 186 may be called a microcomputer in a structure according to this embodiment.

A random number signal is classified into one of patterns depending on an obtained random number and is used for setting of the sequence in the sequence determination circuit 185. The sequence of light emission of light sources of, for example, three colors of red (R), green (G), and blue (B) may be determined using the last two digits of a random number obtained by random number generation. Note that the number of colors of the light sources is not particularly limited in this embodiment.

Specifically, when the last two digits of a random number are "00" to "16", a random number signal is for setting the sequence of light emission in the sequence determination circuit 185 to be R, G, and B in this order. When the last two digits of a random number are "17" to "33", a random number signal is for setting the sequence of light emission in the sequence determination circuit 185 to be R, B, and G in this order. When the last two digits of a random number are "34" to "50", a random number signal is for setting the sequence of light emission in the sequence determination circuit 185 to be G, R, and B in this order. When the last two digits of a random number are "51" to "66", a random number signal is for setting the sequence of light emission in the sequence determination circuit 185 to be G, B, and R in this order. When the last two digits of a random number are "67" to "83", a random number signal is for setting the sequence of light emission in the sequence determination circuit 185 to be B, R, and G in this order. When the last two digits of a random number are "84" to "99", a random number signal is for setting the sequence of light emission in the sequence determination circuit 185 to be B, G, and R in this order.

Figure 18:
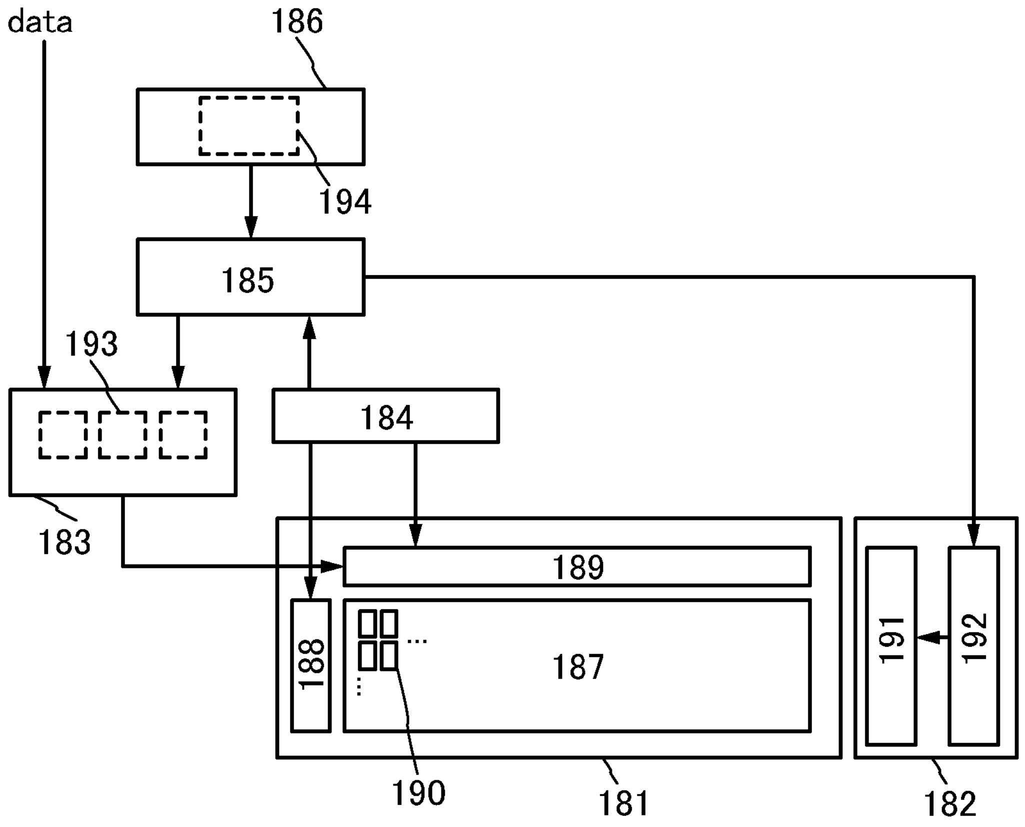
FIG. 18 is a block diagram according to one embodiment of the present invention.

Note that a random number signal may be generated using a random number based on a chaotic theory, such as a chaotic random number obtained using a solution of a nonlinear differential equation. In the case where a chaotic random number is generated in the random number generation circuit 186, a chaotic random number generation portion 194 may be provided in the random number generation circuit 186 in the structure of FIG. 1 as illustrated in FIG. 18 so that operation is carried out in the chaotic random number generation portion 194.

Here, what chaos is will be explained. In nature and an artificial world, there are many predictable phenomena; it is possible to predict positions of Halley's comet and an artificial satellite and take measures. Deterministic predictability in which a causal relation is clear seems to be one kind of great power of science.

However, weather forecast is often not right although weather is considered as the air motion following a physical law. Such a phenomenon in which a cause and a result seem to be unclear is said to have an immethodical element, and is believed to be accurately predictable basically if perfect parameters that describe a system are found, in other words, if data on the system can be collected sufficiently.

That is to say, disorder is considered to be due to lack of data on a multi-degree-of-freedom system. However, the finding that even a simple system having a low degree of freedom (three or more dimensions) shows a disordered behavior reveals that a phenomenon or the like that is deterministic but has essential disorder exists. Such disorder is called chaos.

However, the concept of chaos has not been unified. Similarly to the theory of evolution, the definition of the concept of chaos is broad, and depending on an object, the concept seems to take on a life of its own. Therefore, in this specification, chaos is summarized daringly as follows.

Chaos means the phenomenon which is a system having deterministic rules but having an extremely complex nonlinear behavior, such that it has essential disorder. In contrast, there are complex order and rules behind a phenomenon that seems not to have regularity and predictability and thus not to have order.

Such a concept regarding chaos is applied mathematically and a specific nonlinear equation is solved, whereby a significantly high-quality random number can be generated. Given as an example of generation of a random number is the case where the following one-dimensional nonlinear difference equation expressed with a map r from a section to a section may have an irregular and disorderly solution called chaos.

$$x_{n+1}=r(x_n)\ n=0,1,\ldots \quad \text{[EQUATION 1]}$$

Simple examples of such nonlinear maps include the Bernoulli shift, the logistic map, the tent map, and the Chebyshev map.

For example, the Bernoulli shift is expressed by the following equation.

$$r(x_n)=\begin{cases} 2x_n, & 0\leqq x_n\leqq 1/2 \\ 2x_n-1, & 1/2\leqq x_n\leqq 1 \end{cases} \quad \text{[EQUATION 2]}$$

The logistic map is expressed by the following equation.

$$r(x_n)=bx_n(1-x_n) \quad \text{[EQUATION 3]}$$

In particular, in the above equation of the logistic map, the case where b is 4.0 is referred to as "pure chaos".

The tent map is expressed by the following equation.

$$r(x_n)=\begin{cases} x_n/\theta, & 0\leqq x_n\leqq \theta \\ (1-x_n)/(1-\theta), & \theta\leqq x_n\leqq 1 \end{cases} \quad \text{[EQUATION 4]}$$

The Chebyshev map is expressed by the following equation.

$$r(x_n)=\cos(n\cos^{-1}x_n) \quad \text{[EQUATION 5]}$$

Solutions of equations of the Bernoulli shift, the logistic map, the tent map, the Chebyshev map, and the like are each a chaotic random number. In general, regularity of such a random number is not found. A chaotic random number can be generated with a map other than the above maps.

For example, when a parameter b varies in the equation of the logistic map, a solution also varies; as b gets closer to 4, the solution is a more chaotic random number within the range of from 0.0 to 1.0. In contrast, when the parameter b varies so as to be more distant from 4, a solution to be obtained can have limitation; for example, a solution converges to one when b is 2, and a solution converges to four when b is around 3.5. As b is closer to 4, the limitation is reduced, and a chaotic random number in a certain range is obtained as a solution.

Figure 19:
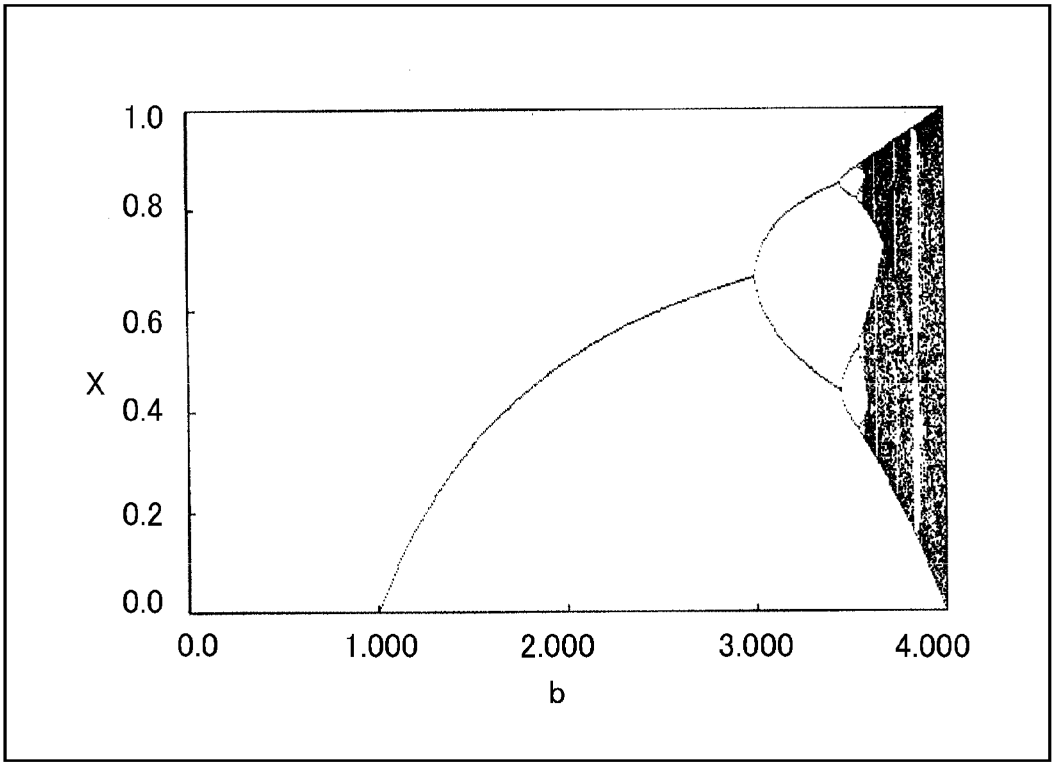
FIG. 19 is a graph showing chaotic random numbers, according to one embodiment of the present invention.

FIG. 19 shows such a state. Specifically, FIG. 19 shows values of solutions of the equation of the logistic map, which are obtained by carrying out operations when n is greater than or equal to 300 and less than or equal to 500 in the condition where an initial value Xo is 0.3, a parameter b varies from 0 to 4, and n is 500. A value shown by the vertical axis, which corresponds to a position of a black dot in the graph, is a value of a solution. As described above, a solution converges to one when b is smaller than around 3, and a solution converges to two when b is around 3.1 to 3.4. As b is larger, the number of positions to which a solution converges increases to 4, 8, . . . ; thus, chaotic random numbers are generated gradually.

Note that in the case where b is set to 4, for example, a solution may be 0.5 after calculations are repeated certain times, depending on a manner in which a significant figure is obtained in arithmetic processing. Since solutions obtained after that is all 0.5, unless attention is paid to a manner in which a significant figure is obtained in arithmetic processing, the range of the repeat count of utilization of solutions, and the like, chaotic random numbers are not generated in some cases.

Chaotic random numbers generated in such a generation method may be utilized for different cases so that random number signals used for setting the sequence in the sequence determination circuit 185 are generated. The sequence of light emission of light sources of, for example, red (R), green (G), and blue (B) may be determined using the last two digits of a chaotic random number obtained by generation of chaotic random numbers. Note that the number of colors of light sources in this embodiment is not particularly limited.

Figure 14:
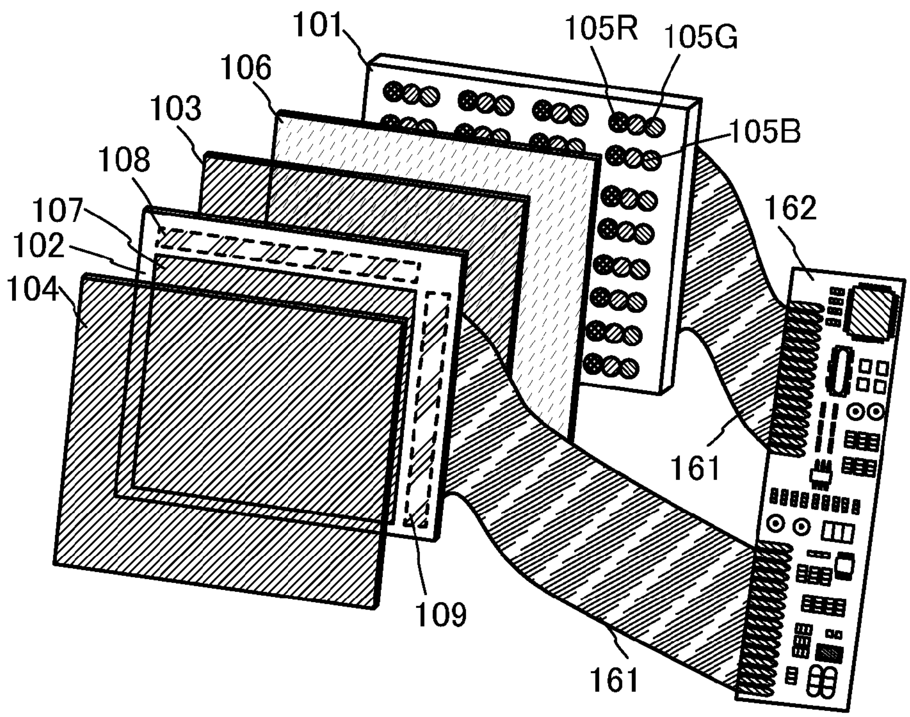
FIG. 14 is a schematic view according to one embodiment of the present invention.

Next, FIG. 14 is a schematic external view of a liquid crystal display device. The liquid crystal display device in FIG. 14 includes a backlight portion 101; a display panel 102 in which a plurality of pixels is arranged in matrix; and a polarizing plate 103 and a polarizing plate 104 between which the display panel 102 is sandwiched. In the backlight portion 101, light sources of three colors of red, green, and blue 105R, 105G, and 105B, specifically, light sources each including a combination of light-emitting diodes (LEDs) of three colors of RGB are arranged in matrix. In addition, a diffuser plate 106 is placed between the display panel 102 and the backlight portion 101 in order to bring evenness of light emitted from the backlight portion 101.

The display panel 102 and the backlight portion 101 in FIG. 14 correspond to the display panel 181 and the backlight portion 182 in FIG. 1, respectively. Further, it is possible to form the video signal selection circuit 183, the control circuit 184, the sequence determination circuit 185, and the random number generation circuit 186 which are illustrated in FIG. 1 over an external substrate 162 illustrated in FIG. 14.

Note that the polarizing plate 103 and the polarizing plate 104 may be omitted depending on a liquid crystal material of the display panel 102. The number of the diffuser plate 106 may be plural and the position thereof may be another position.

Light emission and the colors of light emission of the light sources of three colors in the backlight portion 101 are switched in accordance with a video signal supplied externally. In a field-sequential liquid crystal display device, light emission of the light sources 105R, 105G, and 105B is switched temporally and transmission of light of different colors in pixels is controlled, whereby a viewer can see an image of color display. Light emission of the light source includes switching of luminance of the light source in accordance with a video signal for display.

Note that although in this embodiment, the light sources in the backlight are supposed to be light-emitting diodes, they may be another type of light sources as long as the type of light sources produce lights of desired colors. The light-emitting diodes provided as light sources are arranged in matrix behind the plurality of pixels.

The display panel 102 in FIG. 14 includes a pixel portion 107, a scan line driver circuit 108 (also referred to as a gate line driver circuit), and a signal line driver circuit 109 (also referred to as a data line driver circuit). Note that the scan line driver circuit 108 and/or the signal line driver circuit 109 may be formed outside the display panel 102. The pixel portion 107 in the display panel 102 includes a plurality of pixels.

The backlight portion 101 and the display panel 102 are electrically connected to each other through an external substrate 162 provided with a display switch circuit, a display control circuit, and the like, and flexible printed circuits (FPCs) 161 serving as external input terminals.

Next, FIGS. 2A and 2B to FIG. 6 illustrate specific configuration examples and specific operation of the display panel 181 and the backlight portion 182 and are used to describe driving of the liquid crystal display device having the structure in FIG. 1. Hereinafter, a configuration example of the display panel, a configuration example of the scan line driver circuit, an example of operation of the scan line driver circuit, a configuration example of the signal line driver circuit, a configuration example of the backlight portion, and an example of operation of the display panel will be described to explain the display panel.

Figure 2A:
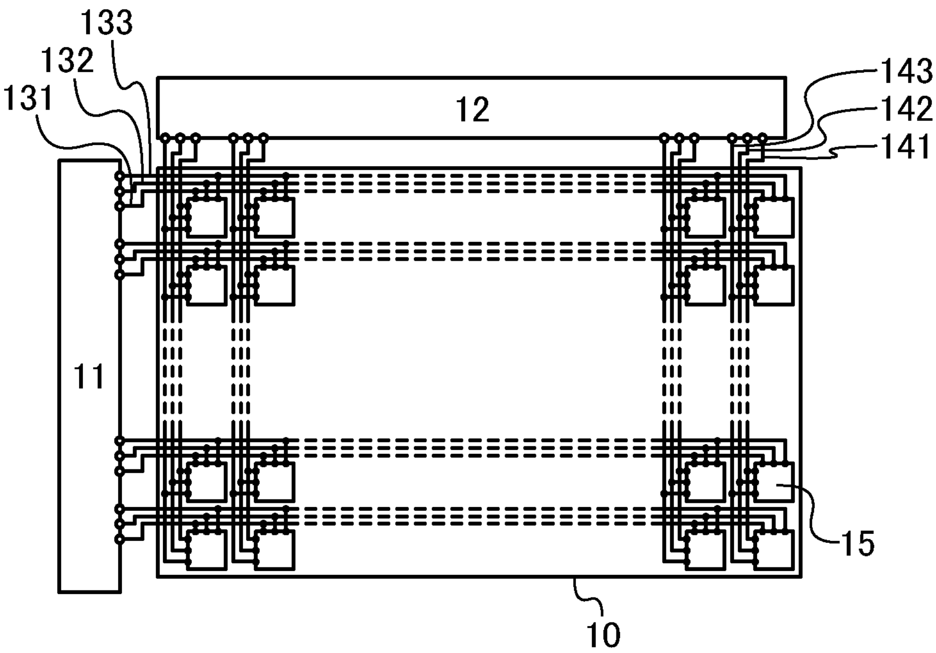
FIGS. 2A and 2B are circuit diagrams according to one embodiment of the present invention.

First, the configuration example of the display panel will be described. FIG. 2A illustrates the configuration example of the display panel. The display panel in FIG. 2A includes a pixel portion 10; a scan line driver circuit 11; a signal line driver circuit 12; 3n scan lines 131, 3n scan lines 132, and 3n scan lines 133 (n is a natural number of 2 or more) arranged parallel or approximately parallel to each other; and m signal lines 141, m signal lines 142, and m signal lines 143 (m is a natural number of 2 or more) arranged parallel or approximately parallel to each other. The potentials of the scan lines 131, 132, and 133 are controlled by the scan line driver circuit 11. The potentials of the signal lines 141, 142, and 143 are controlled by the signal line driver circuit 12.

The pixel portion 10 includes a plurality of pixels 15 arranged in matrix (3n rows by m columns). Each of the scan lines 131, 132, and 133 is electrically connected to m pixels 15 provided in a given row among the plurality of pixels 15 arranged in matrix (the 3n rows by the m columns). Further, each of the signal lines 141, 142, and 143 is electrically connected to 3n pixels 15 provided in a given column among the plurality of pixels 15 arranged in matrix (the 3n rows by the m columns).

Start signals (GSP1 to GSP3) for the scan line driver circuit, a clock signal (GCK) for the scan line driver circuit, and drive power supply potentials such as a high power supply potential ($V_{DD}$) and a low power supply potential ($V_{SS}$) are externally input to the scan line driver circuit 11. Signals such as a start signal (SSP) for the signal line driver circuit, a clock signal (SCK) for the signal line driver circuit, and video signals (DATA1 to DATA3) and drive power supply potentials such as a high power supply potential and a low power supply potential are externally input to the signal line driver circuit 12.

Figure 2B:
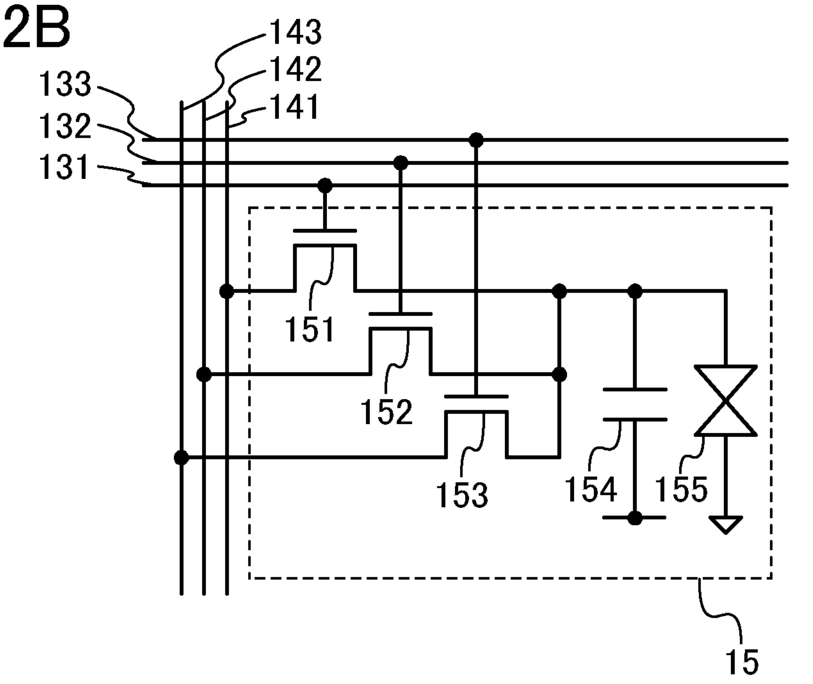

FIG. 2B illustrates an example of a circuit configuration of the pixel 15. The pixel 15 in FIG. 2B includes a transistor 151, a transistor 152, a transistor 153, a capacitor 154, and a liquid crystal element 155. A gate of the transistor 151 is connected to the scan line 131. One of a source and a drain of the transistor 151 is connected to the signal line 141. A gate of the transistor 152 is connected to the scan line 132. One of a source and a drain of the transistor 152 is connected to the signal line 142. A gate of the transistor 153 is connected to the scan line 133. One of a source and a drain of the transistor 153 is connected to the signal line 143. One electrode of the capacitor 154 is connected to the other of the source and the drain of the transistor 151, the other of the source and the drain of the transistor 152, and the other of the source and the drain of the transistor 153. The other electrode of the capacitor 154 is connected to a wiring for supplying a capacitor potential. One electrode (pixel electrode) of the liquid crystal element 155 is connected to the other of the source and the drain of the transistor 151, the other of the source and the drain of the transistor 152, the other of the source and the drain of the transistor 153, and the one electrode of the capacitor 154. The other electrode (counter electrode) of the liquid crystal element 155 is connected to a wiring for supplying a counter potential.

Note that a transistor is an element that includes at least three terminals, including a gate, a drain, and a source, and includes a channel formation region between a drain region and a source region. A current can flow through the drain region, the channel region, and the source region. Here, since the source and the drain of the transistor may change depending on the structure, the operating condition, and the like of the transistor, it is difficult to define which is a source or a drain. Therefore, in this document (the specification, the claims, the drawings, and the like), a region functioning as a source or a drain is not called the source or the drain in some cases. In such a case, for example, one of the source and the drain may be referred to as a first terminal and the other may be referred to as a second terminal. Alternatively, one of the source and the drain may be referred to as a first electrode and the other may be referred to as a second electrode. Still alternatively, one of the source and the drain may be referred to as a source region and the other may be called a drain region.

Figure 3:
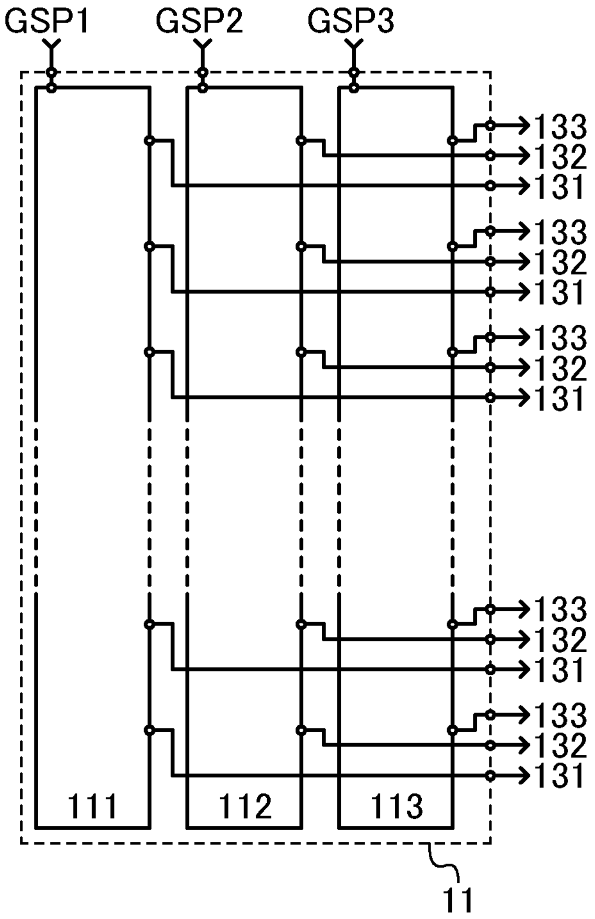
FIG. 3 is a circuit diagram according to one embodiment of the present invention.

Next, a configuration example of the scan line driver circuit 11 will be described. FIG. 3 illustrates the configuration example of the scan line driver circuit 11 in the display panel illustrated in FIG. 2A. The scan line driver circuit 11 in FIG. 3 includes three shift registers 111 to 113 each including 3n output terminals. Note that each of the output terminals of the shift register 111 is connected to one of the 3n scan lines 131 provided in the pixel portion 10. Each of the output terminals of the shift register 112 is connected to one of the 3n scan lines 132 provided in the pixel portion 10. Each of the output terminals of the shift register 113 is connected to one of the 3n scan lines 133 provided in the pixel portion 10. In other words, the shift register 111 drives the scan lines 131, the shift register 112 drives the scan lines 132, and the shift register 113 drives the scan lines 133. Specifically, the shift register 111 has a function of sequentially shifting selection signals from the scan line 131 in the first row (i.e., a function of sequentially selecting the scan lines 131 every half the cycle of the clock signal (GCK) for the scan line driver circuit) by using a first start pulse signal (GSP1) for the scan line driver circuit, which is input externally, as a trigger. The shift register 112 has a function of sequentially shifting selection signals from the scan line 132 in the first row, by using a second start pulse signal (GSP2) for the scan line driver circuit, which is input externally, as a trigger. The shift register 113 has a function of sequentially shifting selection signals from the scan line 133 in the first row, by using a third start pulse signal (GSP3) for the scan line driver circuit, which is input externally, as a trigger.

Figure 4:
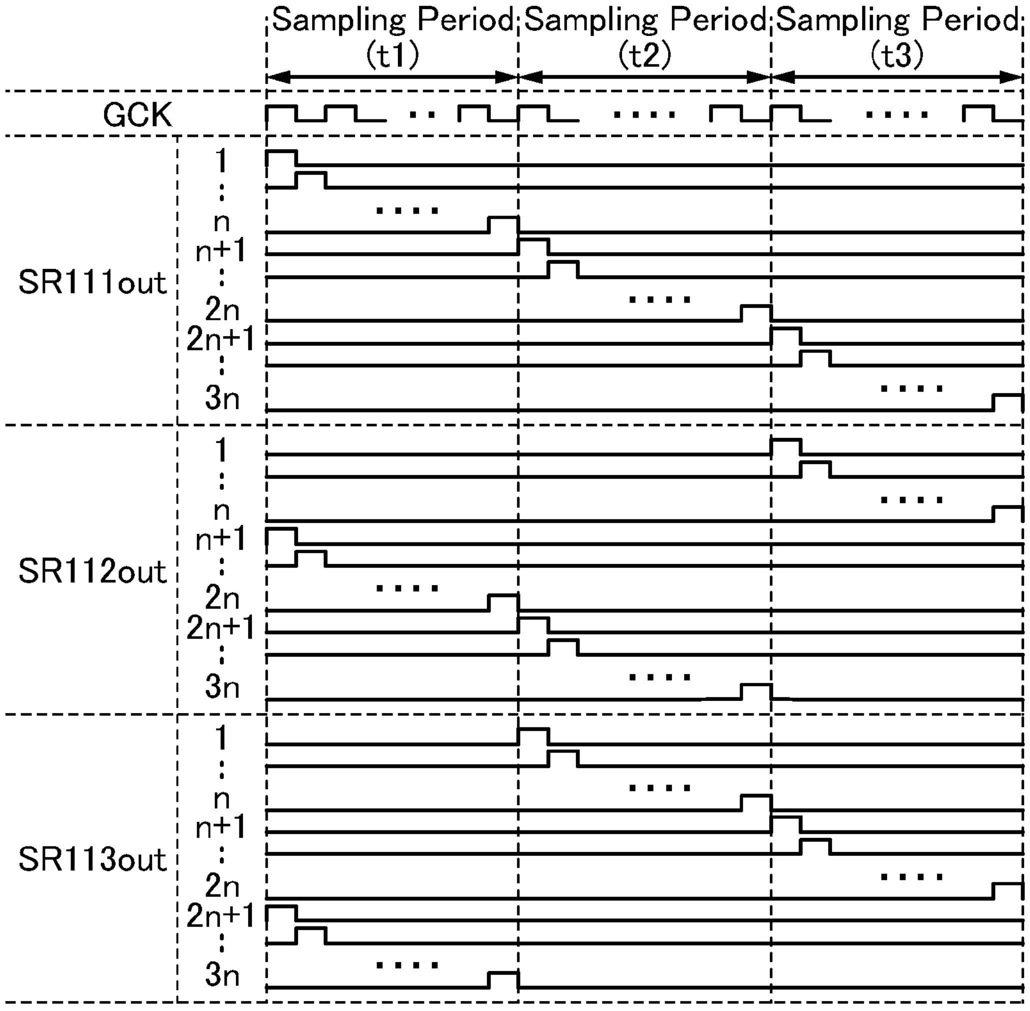
FIG. 4 is a timing chart according to one embodiment of the present invention.

Next, an example of operation of the scan line driver circuit 11 will be described with reference to FIG. 4. Note that FIG. 4 shows the clock signal (GCK) for the scan line driver circuit, signals (SR111out) output from the 3n output terminals of the shift register 111, signals (SR112out) output from the 3n output terminals of the shift register 112, and signals (SR113out) output from the 3n output terminals of the shift register 113.

In a sampling period (t1), high-level potentials are sequentially shifted from the scan line 131 provided in the first row to the scan line 131 provided in the n-th row every half the cycle of the clock signal (horizontal scan period) in the shift register 111; high-level potentials are sequentially shifted from the scan line 132 provided in the (n+1)-th row to the scan line 132 provided in the 2n-th row every half the cycle of the clock signal (horizontal scan period) in the shift register 112; and high-level potentials are sequentially shifted from the scan line 133 provided in the (2n+1)-th row to the scan line 133 provided in the 3n-th row every half the cycle of the clock signal (horizontal scan period) in the shift register 113. Accordingly, the scan line driver circuit 11 sequentially selects m pixels 15 in the first row to m pixels 15 in the n-th row through the scan lines 131, sequentially selects m pixels 15 in the (n+1)-th row to m pixels 15 in the 2n-th row through the scan lines 132, and sequentially selects m pixels 15 in the (2n+1)-th row to m pixels 15 in the 3n-th row through the scan lines 133. In other words, the scan line driver circuit 11 can supply selection signals to 3m pixels 15 provided in different three rows every horizontal scan period.

In a sampling period (t2), although output signals of the shift registers 111 to 113 are different from those in the sampling period (t1), the following operation is the same as that in the sampling period (t1): one of the shift registers 111 to 113 (the shift register 113 in the sampling period (t2)) sequentially selects the m pixels 15 provided in the first row to the m pixels 15 provided in the n-th row; another one of the shift registers 111 to 113 that is different from the one of the shift registers 111 to 113 (the shift register 111 in the sampling period (t2)) sequentially selects the m pixels 15 provided in the (n+1)-th row to the m pixels 15 provided in the 2n-th row; and the other of the shift registers 111 to 113 that is different from the two of the shift registers 111 to 113 (the shift register 112 in the sampling period (t2)) sequentially selects the m pixels 15 provided in the (2n+1)-th row to the m pixels 15 provided in the 3n-th row. In other words, the scan line driver circuit 11 can supply selection signals to 3m pixels 15 provided in given three rows every horizontal scan period, as in the sampling period (t1).

Figure 5A:
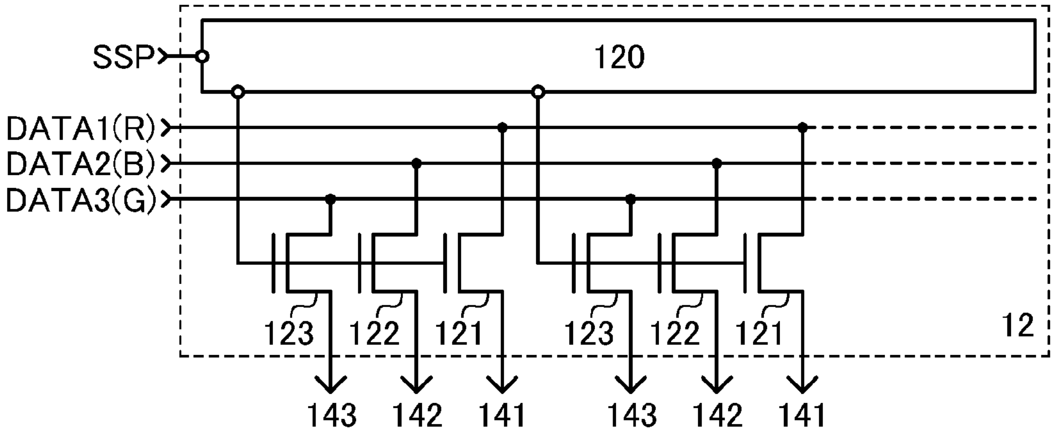
FIGS. 5A and 5B are a circuit diagram and a block diagram according to one embodiment of the present invention, respectively.

Next, a configuration example of the signal line driver circuit 12 will be described. FIG. 5A illustrates the configuration example of the signal line driver circuit 12 in the display panel illustrated in FIG. 2A. The signal line driver circuit 12 in FIG. 5A includes a shift register 120 having m output terminals, m transistors 121, m transistors 122, and m transistors 123. Note that a gate of the transistor 121 is connected to the j-th output terminal (j is a natural number that is 1 or more and m or less) of the shift register 120; one of a source and a drain of the transistor 121 is connected to a wiring for supplying the first video signal (DATA1); and the other of the source and the drain of the transistor 121 is connected to the signal line 141 provided in the j-th column in the pixel portion 10. In addition, a gate of the transistor 122 is connected to the j-th output terminal of the shift register 120; one of a source and a drain of the transistor 122 is connected to a wiring for supplying the second video signal (DATA2); and the other of the source and the drain of the transistor 122 is connected to the signal line 142 provided in the j-th column in the pixel portion 10. Further, a gate of the transistor 123 is connected to the j-th output terminal of the shift register 120; one of a source and a drain of the transistor 123 is connected to a wiring for supplying the third video signal (DATA3); and the other of the source and the drain of the transistor 123 is connected to the signal line 143 provided in the j-th column in the pixel portion 10.

Here, as the first video signal (DATA1), a red (R) video signal (a video signal held in the pixel 15 when red (R) light is emitted from the backlight) is supplied to the signal line 141; as the second video signal (DATA2), a blue (B) video signal is supplied to the signal line 142; and as the third video signal (DATA3), a green (G) video signal is supplied to the signal line 143.

Figure 5B:
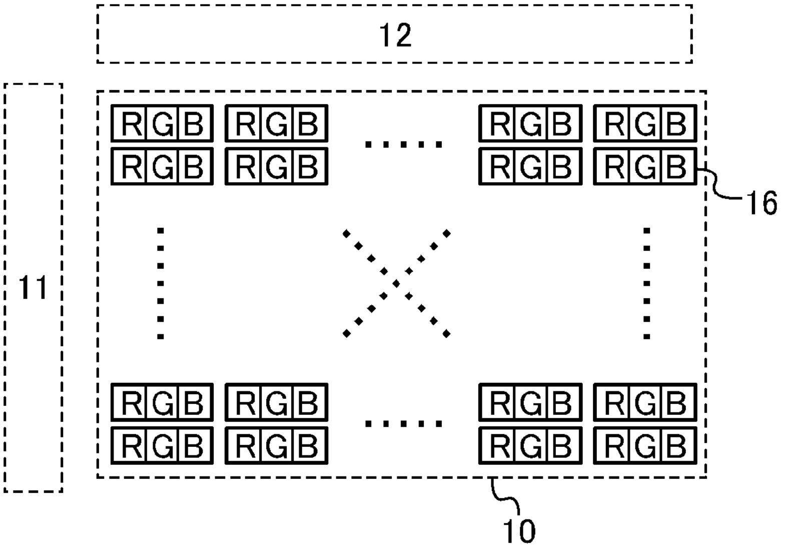

Next, a configuration example of the backlight portion will be described. FIG. 5B illustrates the configuration example of the backlight portion provided behind the pixel portion 10 in the display panel illustrated in FIG. 2A. The backlight in FIG. 5B includes a plurality of light sources 16 of three colors of red (R), green (G), and blue (B). Note that the plurality of light sources 16 are arranged in matrix and light emission of the light sources 16 can be controlled in each given region. Here, the light source 16 is provided for at least every k rows by m columns (here, k is n/4 and a natural number of 2 or more) for a backlight for the plurality of pixels 15 provided in the 3n rows by the m columns. Light emission of the light sources 16 can be controlled independently. In other words, the backlight includes at least the light source for the first to the k-th rows to the light source for the (2n+3k+1)-th to the 3n-th rows, and light emission of the light sources can be controlled independently.

The structure where light sources of three colors of red (R), green (G), and blue (B) are used for the backlight; however, the display panel according to this embodiment is not limited to this structure. That is to say, in the display panel according to this embodiment, light sources that emit lights of given colors can be used in combination. For example, light sources of four colors of red (R), green (G), blue (B), and white (W), light sources of four colors of red (R), green (G), blue (B), and yellow (Y), or light sources of three colors of cyan (C), magenta (M), and yellow (Y) can be used in combination. Alternatively, light sources of six colors of pale red (R), pale green (G), pale blue (B), deep red (R), deep green (G), and deep blue (B), or light sources of six colors of red (R), green (G), blue (B), cyan (C), magenta (M), and yellow (Y) can be used in combination. Still alternatively, as light sources of the backlight, the following may be used: a structure where a light source that emit white (W) light is used in addition to light sources of red (R), green (G), and blue (B), or a structure where light sources of red (R), green (G), and blue (B) emit lights at the same time to serve as a light source that emit white (W) light so that lights of four colors can be emitted from the backlight. Note that to produce white (W) light, any one of combinations of two of light sources of red (R) and cyan (C), green (G) and magenta (M), and blue (B) and yellow (Y) of the backlight may emit lights at the same time. In such a manner, with a combination of lights of a wider variety of colors, the color gamut of the display panel can be widened, and the image quality can be improved.

The display panel described above has a structure where light sources of three colors of red (R), green (G), and blue (B) are arranged laterally and linearly as light sources of the backlight (see FIG. 5B); however, the structure is not limited thereto. For example, the light sources of the three colors may be arranged in triangle, or the light sources of the three colors may be arranged longitudinally and linearly. Moreover, the display panel described above includes a direct-lit backlight as the backlight (see FIG. 5B); however, an edge-lit backlight may be used as the backlight.

Figure 6:
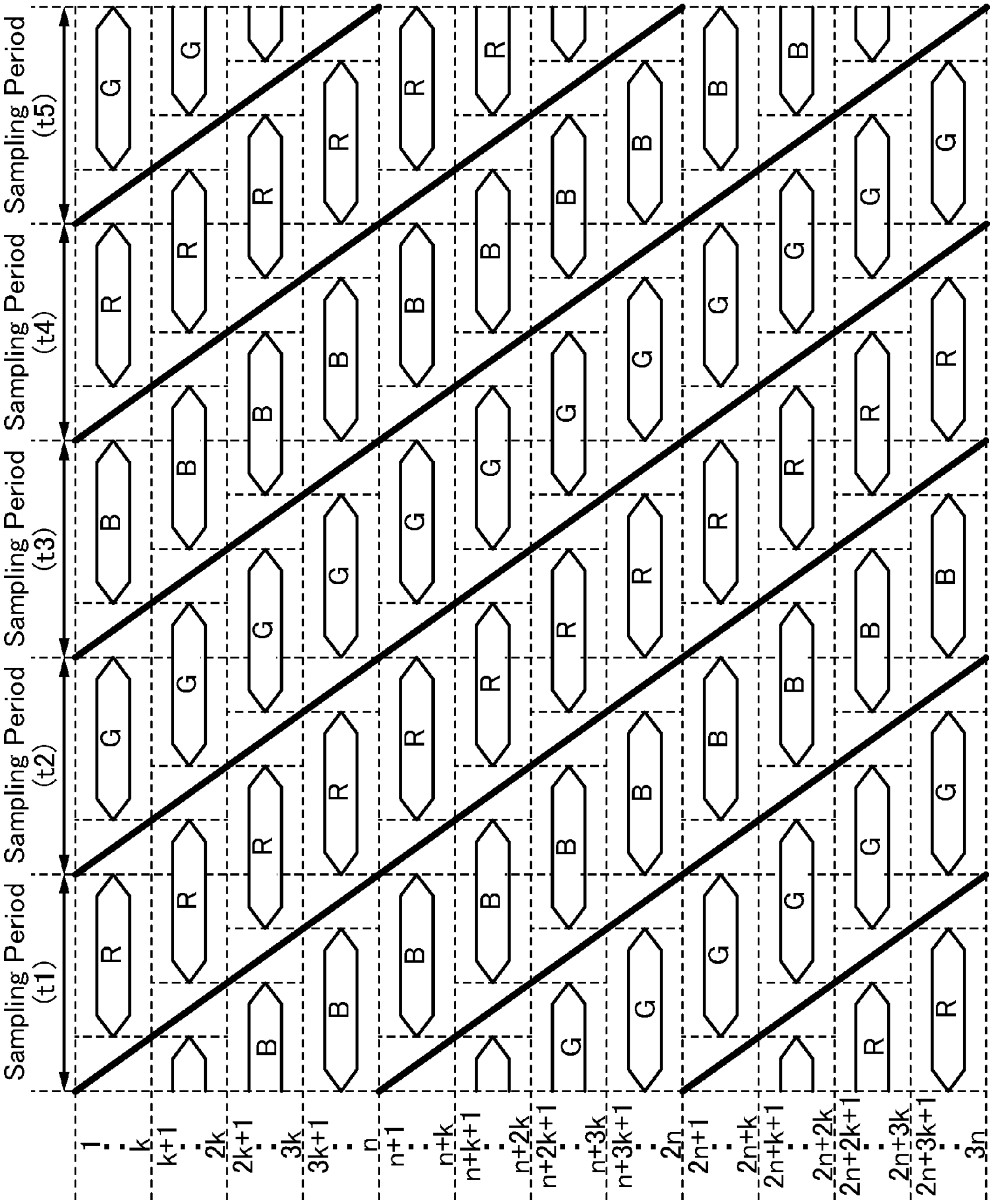
FIG. 6 is a timing chart according to one embodiment of the present invention.

Next, an example of operation of the display panel will be described. FIG. 6 shows scanning of selection signals in the display panel and timings of light emission of the light sources in the backlight portion. In the display panel, in the sampling period (t1), the m pixels 15 provided in the first row to the m pixels 15 provided in the n-th row are sequentially selected; the m pixels 15 provided in the (n+1)-th row to the m pixels 15 provided in the 2n-th row are sequentially selected; and the m pixels 15 provided in the (2n+1)-th row to the m pixels 15 provided in the 3n-th row are sequentially selected, so that video signals can be input to the pixels. A region provided with the m pixels 15 in the first row to the m pixels 15 in the n-th row is also referred to as a first pixel region. A region provided with the m pixels 15 in the (n+1)-th row to the m pixels 15 provided in the 2n-th row is also referred to as a second pixel region. A region provided with the m pixels 15 in the (2n+1)-th row to the m pixels 15 provided in the 3n-th row is also referred to as a third pixel region.

Further, FIG. 6 will be specifically described below. In the display panel, in the sampling period (t1), the red (R) video signals can be sequentially input to the pixels through the signal lines 141 when the transistors 151 included in the m pixels 15 provided in the first row to the transistors 151 included in the m pixels 15 provided in the n-th row are sequentially turned on through the scan lines 131; the blue (B) video signals can be sequentially input to the pixels through the signal lines 142 when the transistors 152 included in the m pixels 15 provided in the (n+1)-th row to the transistors 152 included in the m pixels 15 provided in the 2n-th row are sequentially turned on through the scan lines 132; and the green (G) video signals can be sequentially input to the pixels through the signal lines 143 when the transistors 153 included in the m pixels 15 provided in the (2n+1)-th row to the transistors 153 included in the m pixels 15 provided in the 3n-th row are sequentially turned on through the scan lines 133.

Further, in the display panel, in the sampling period (t1), red (R) light is emitted from the light source for the first to the k-th rows after the red (R) video signals are input to the m pixels 15 provided in the first row to the m pixels 15 provided in the k-th row; blue (B) light is emitted from the light source for the (n+1)-th row to the (n+k)-th rows after the blue (B) video signals are input to the m pixels 15 provided in the (n+1)-th row to the m pixels 15 provided in the (n+k)-th row; and green (G) light is emitted from the light source for the (2n+1)-th to the (2n+k)-th rows after the green (G) video signals are input to the m pixels 15 provided in the (2n+1)-th row to the m pixels 15 provided in the (2n+k)-th row. In other words, in the display panel, scanning of a selection signal and light emission of a light source of a given color (red (R), green (G), and blue (B)) can be performed concurrently in each region (the first to the n-th rows, the (n+1)-th to the 2n-th rows, or the (2n+1)-th to the 3n-th rows).

The light source for the first to the k-th rows is also referred to as a first light source region. The light source for the (n+1)-th to the (n+k)-th rows is also referred to as a second light source region. The light source for the (2n+1)-th to the (2n+k)-th rows is also referred to as a third light source region.

In the display panel described above, video signals can be simultaneously supplied to pixels provided in a plurality of rows, among the pixels arranged in matrix. Thus, the frequency of input of a video signal to each pixel can be increased without a change in response speed of a transistor or the like included in the display panel. Specifically, in the display panel, the frequency of input of a video signal to each pixel can be tripled without a change in clock frequency or the like of the scan line driver circuit. In other words, the display panel is preferably applied to a display panel in which images are displayed by a field sequential method or a display panel driven by high frame rate driving.

Next, an advantageous effect of a structure of this embodiment generated by the video signal selection circuit 183, the control circuit 184, the sequence determination circuit 185, and the random number generation circuit 186 which are illustrated in FIG. 1 in addition to the structure of the display panel described above will be described the with reference to a specific example.

Figure 7A:
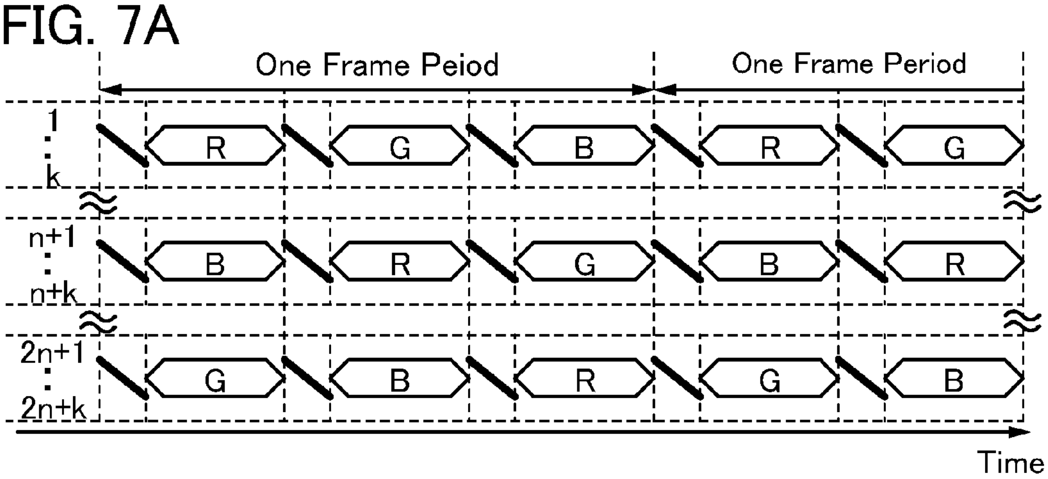
FIGS. 7A to 7E are a timing chart and diagrams illustrating sequence of light emission of a backlight, according to embodiments of the present invention.

FIG. 7A shows extraction from the timing chart of FIG. 6, in which red (R) light is emitted from the light source for the first to the k-th rows after the red (R) video signals are input to the pixels provided in the first to the k-th rows; blue (B) light is emitted from the light source for the (n+1)-th to the (n+k)-th rows after the blue (B) video signals are input to the pixels provided in the (n+1)-th to the (n+k)-th rows; and green (G) light is emitted from the light source for the (2n+1)-th to the (2n+k)-th rows after the green (G) video signals are input to the pixels provided in the (2n+1)-th to the (2n+k)-th rows.

In the pixels provided in the first to the k-th rows in FIG. 7A, a color image can be displayed through a period in which the red (R) video signals are input and red (R) light is emitted, the green (G) video signals are input and green (G) light is emitted, and the blue (B) video signals are input and blue (B) light is emitted. This period is one frame period. Similarly, in the pixels provided in the (n+1)-th to the (n+k)-th rows in FIG. 7A, one frame period is a period in which the blue (B) video signals are input and blue (B) light is emitted, the red (R) video signals are input and red (R) light is emitted, and the green (G) video signals are input and green (G) light is emitted. Similarly, in the pixels provided in the (2n+1)-th to the (2n+k)-th rows in FIG. 7A, one frame period is a period in which the green (G) video signals are input and green (G) light is emitted, the blue (B) video signals are input and blue (B) light is emitted, and the red (R) video signals are input and red (R) light is emitted.

Figure 7B:
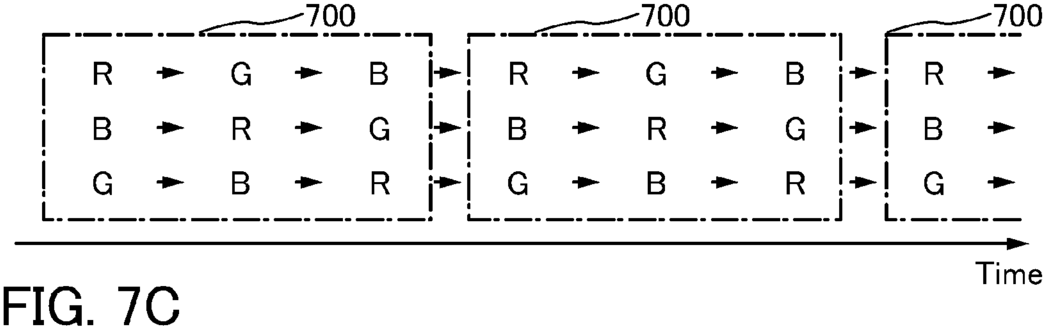

In FIG. 7B, illustration of input of the video signals in FIG. 7A is omitted and only light emission of the light sources is illustrated. As in FIG. 7A, a period indicated by an alternate long and short dashed line 700 corresponds to one frame period.

The sequence determination circuit 185 described in FIG. 1 determines the sequence of input of the RGB video signals in one frame period in FIGS. 7A and 7B in accordance with a signal from the random number generation circuit 186 (also referred to as a random number signal) and the sequence of light emission of the backlight in the frame period in accordance with the video signals.

Figure 7C:
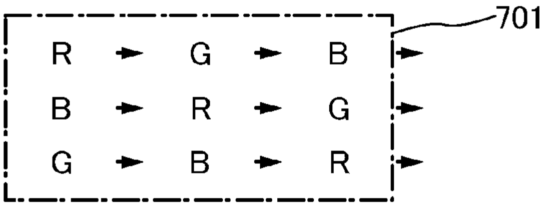

For example, the sequence of input of the video signals depending on a random number signal from the random number generation circuit 186 and the sequence of light emission of the backlight depending on the video signals in a certain period are illustrated without illustration of input of the video signals, as in FIG. 7B. Thus, as illustrated in FIG. 7C, in a certain period, red (R) light, green (G) light, and blue (B) light are sequentially emitted in the pixels in the first to the k-th rows; blue (B) light, red (R) light, and green (G) light are sequentially emitted in the pixels in the (n+1)-th to the (n+k)-th rows; and green (G) light, blue (B) light, and red (R) light are sequentially emitted in the pixels in the (2n+1)-th to the (2n+k)-th rows. As in FIG. 7B, a period indicated by an alternate long and short dashed line 701 is one frame period.

Figure 7D:
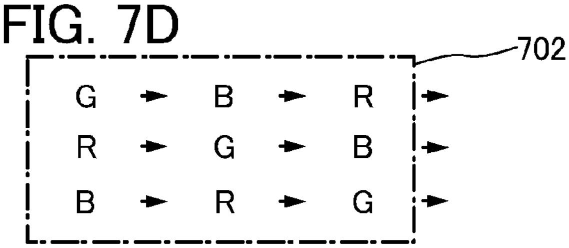

Further, the sequence of input of the video signals depending on a random number signal from the random number generation circuit 186 and the sequence of light emission of the backlight depending on the video signals in a period different from the period in FIG. 7C are illustrated without illustration of input of the video signals, as in FIG. 7B. Thus, as illustrated in FIG. 7D, in a certain period, green (G) light, blue (B) light, and red (R) light are sequentially emitted in the pixels in the first to the k-th rows; red (R) light, green (G) light, and blue (B) light are sequentially emitted in the pixels in the (n+1)-th to the (n+k)-th rows; and blue (B) light, red (R) light, and green (G) light are sequentially emitted in the pixels in the (2n+1)-th to the (2n+k)-th rows. As in FIG. 7B, a period indicated by an alternate long and short dashed line 702 is one frame period.

Figure 7E:
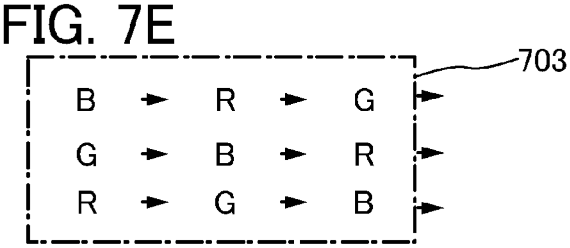

Further, the sequence of input of the video signals depending on a random number signal from the random number generation circuit 186 and the sequence of light emission of the backlight depending on the video signals in a period different from the periods in FIGS. 7C and 7D are illustrated without illustration of input of the video signals, as in FIG. 7B. Thus, as illustrated in FIG. 7E, in a certain period, blue (B) light, red (R) light, and green (G) light are sequentially emitted in the pixels in the first to the k-th rows; green (G) light, blue (B) light, and red (R) light are sequentially emitted in the pixels in the (n+1)-th to the (n+k)-th rows; and red (R) light, green (G) light, and blue (B) light are sequentially emitted in the pixels in the (2n+1)-th to the (2n+k)-th rows. As in FIG. 7B, a period indicated by an alternate long and short dashed line 703 is one frame period.

Besides the sequence of input of the video signals and the sequence of light emission of the backlight depending on the video signals which are illustrated in FIGS. 7C to 7E, the sequence of light emission of the light sources in one frame period, which can be determined in accordance with a random number signal from the random number generation circuit 186, and the sequence of input of the video signals depending on the sequence of light emission of the light sources in the frame period are given below. In a frame period, in the pixels in the first to the k-th rows, red (R) light, blue (B) light, and green (G) light are sequentially emitted; in the pixels in the (n+1)-th to the (n+k)-th rows, green (G) light, red (R) light, and blue (B) light are sequentially emitted; and in the pixels in the (2n+1)-th to the (2n+k)-th rows, blue (B) light, green (G) light, and red (R) light are sequentially emitted. In another frame period, green (G) light, red (R) light, and blue (B) light are sequentially emitted in the pixels in the first to the k-th rows; blue (B) light, green (G) light, and red (R) light are sequentially emitted in the pixels in the (n+1)-th to the (n+k)-th rows; and red (R) light, blue (B) light, and green (G) light are sequentially emitted in the pixels in the (2n+1)-th to the (2n+k)-th rows. In still another frame period, blue (B) light, green (G) light, and red (R) light are sequentially emitted in the pixels in the first to the k-th rows; red (R) light, blue (B) light, and green (G) light are sequentially emitted in the pixels in the (n+1)-th to the (n+k)-th rows; and green (G) light, red (R) light, and blue (B) light are sequentially emitted in the pixels in the (2n+1)-th to the (2n+k)-th rows.

Figure 8A:
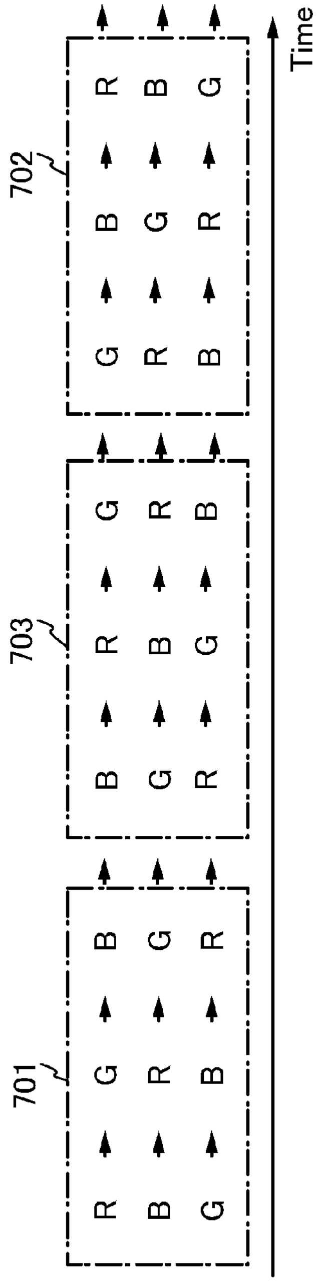
FIGS. 8A to 8C are diagrams illustrating sequence of light emission of a backlight, according to embodiments of the present invention.
Figure 8B:
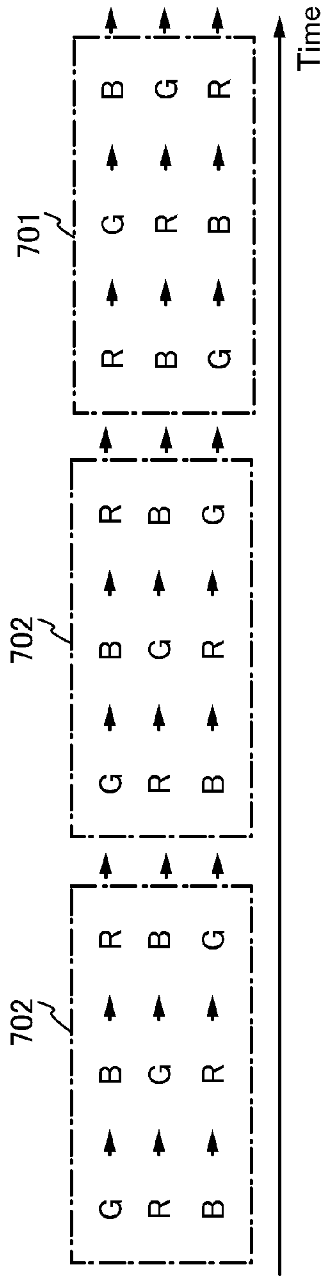
Figure 8C:
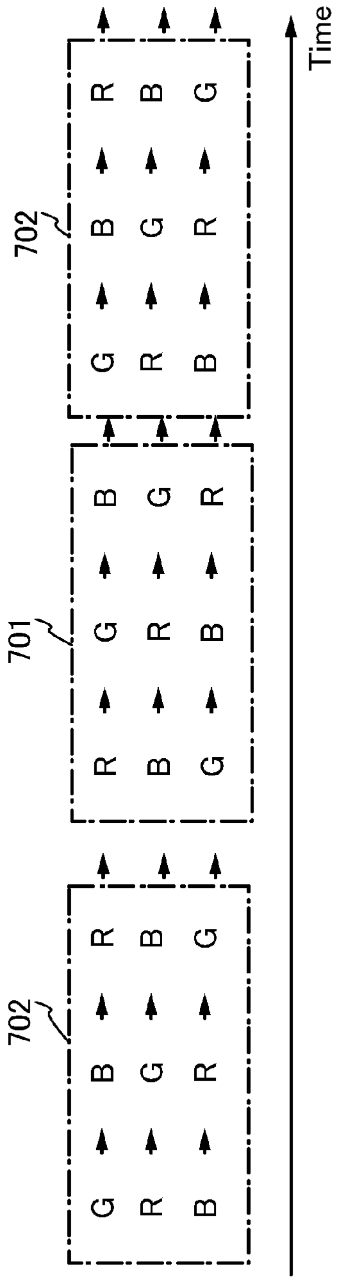

As for the sequence of input of the video signals depending on a random number signal from the random number generation circuit 186 and the sequence of light emission of the backlight depending on the video signals, the sequence of light emission of the light sources in one frame period, which is illustrated in FIGS. 7C to 7E, and the sequence of input of the video signals depending on the sequence of light emission of the light sources in the frame period are determined not in a particular order but at random. For example, as illustrated in FIG. 8A, a certain period sequentially includes the frame period indicated by the alternate long and short dashed line 701, the frame period indicated by the alternate long and short dashed line 703, and the frame period indicated by the alternate long and short dashed line 702. As illustrated in FIG. 8B, another period sequentially includes the frame period indicated by the alternate long and short dashed line 702, the frame period indicated by the alternate long and short dashed line 702, and the frame period indicated by the alternate long and short dashed line 701. As illustrated in FIG. 8C, still another period sequentially includes the frame period indicated by the alternate long and short dashed line 702, the frame period indicated by the alternate long and short dashed line 701, and the frame period indicated by the alternate long and short dashed line 702.

Therefore, in the structure according to this embodiment, the sequence of input of the video signals depending on a random number signal from the random number generation circuit 186 and the sequence of light emission of the backlight depending on the video signals are determined at random. As illustrated in FIGS. 8A to 8C, the sequence of input of the video signals and the sequence of light emission of the backlight in one frame period are determined at random. Thus, perception of color breakup can be suppressed as compared to color images displayed by a field sequential method in which the sequence of input of the video signals and the sequence of light emission of the backlight depending on the video signals are regularly determined.

With the structure according to this embodiment, in which images are displayed by a field sequential method, video signals can be simultaneously supplied to pixels in a plurality of rows. Thus, the frequency of input of a video signal to each pixel can be increased. Therefore, effectual frame frequency can be increased, which leads to suppression of color breakup due to a field sequential method.

Further, with the structure according to this embodiment, in each sampling period of one frame period, the light sources of RGB in the backlight can emit light concurrently. Thus, it is possible to prevent loss of only data of any of the plurality of colors of the light sources for color display due to blinking or the like of a viewer. On the other hand, in the case where light emission is performed in the backlight uniformly on an entire screen, only data of any of the plurality of colors of the light sources for color display might be lost because of blinking or the like of a viewer. Accordingly, the structure according to this embodiment enables suppression of perception of color breakup caused due to loss of perception of light emission from any one of the light sources of the plurality of colors of RGB.

For example, the above display panel has the structure in which video signals are simultaneously supplied to 3m pixels in given three rows in the pixel portion 10; however, the structure of the display panel according to this embodiment of the present invention is not limited to the above structure. That is, in the display panel according to this embodiment, video signals can be simultaneously supplied to a plurality of pixels in given plural rows in the pixel portion 10. Note that it is obvious that in the case where the number of rows is changed, the number of rows and the number of shift registers are necessary to be the same.

The display panel has a structure where video signals are simultaneously supplied to pixels provided in given three rows arranged at regular intervals (the interval between rows supplied with video signals is n rows of pixels) in the same period; however, the structure of the display panel according to this embodiment is not limited to such a structure. In other words, the display panel according to this embodiment may have a structure where video signals are simultaneously supplied to pixels in given three rows provided at irregular intervals. Specifically, the display panel may have a structure in which video signals are simultaneously supplied to m pixels in the first row, m pixels in the (a+1)-th row (a is a natural number), and m pixels in an (a+b+1)-th row (b is a natural number other than a).

Moreover, in the display panel of a liquid crystal display device, the scan line driver circuit includes a shift register; however, the shift register can be replaced with a circuit having an equivalent function. For example, the shift register can be replaced with a decoder.

This embodiment can be implemented in appropriate combination with any of the structures described in the other embodiments.

Embodiment 2

In this embodiment, a structure where there are periods in each of which light sources of a backlight do not emit light before and after a period that is one frame period will be described, which is different from the structure in FIG. 6 described in Embodiment 1 showing scanning of selection signals and timings of light emission of the light sources in the backlight. Note that common description between Embodiment 1 and this embodiment will be omitted in this embodiment.

Figure 9:
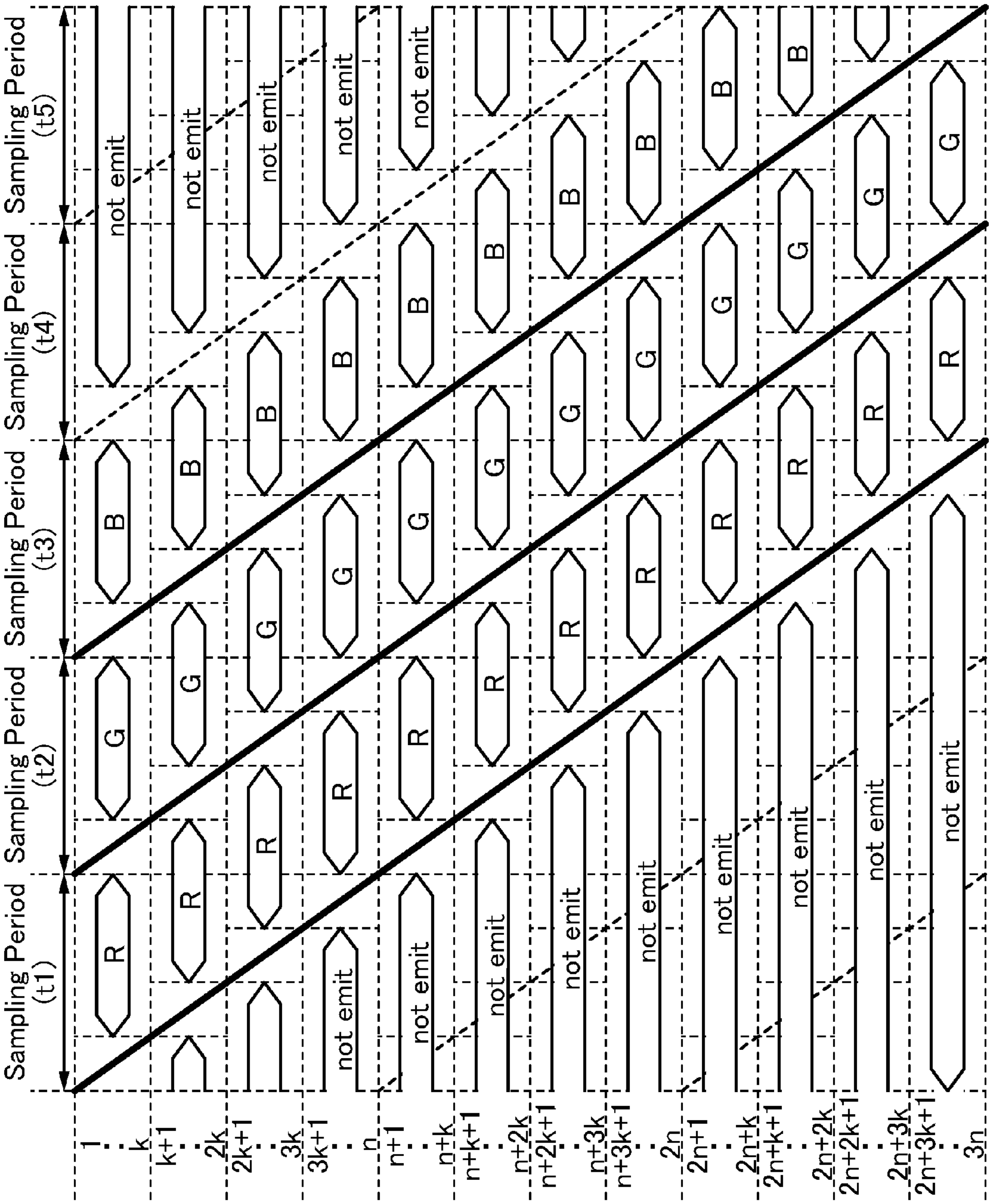
FIG. 9 is a timing chart according to one embodiment of the present invention.

FIG. 9 is a timing chart showing scanning of selection signals and timings of light emission of light sources in a backlight in the case where there are periods in each of which the light sources of the backlight do not emit light before and after a period that is one frame period. The length of the period in which the light sources in the backlight do not emit light is not particularly limited as long as display quality is not degraded.

In the timing chart in FIG. 9, as in FIG. 6, in the sampling period (t1), the m pixels 15 provided in the first row to the m pixels 15 provided in the n-th row are sequentially selected; the m pixels 15 provided in the (n+1)-th row to the m pixels 15 provided in the 2n-th row are sequentially selected; and the m pixels 15 provided in the (2n+1)-th row to the m pixels 15 provided in the 3n-th row are sequentially selected, so that video signals are input to pixels. In FIG. 9, there are periods in each of which selection signals are not scanned and the light sources of the backlight do not emit light before and after a period that is one frame period, and one frame period includes the period in which light emission is not performed in addition to a period in which operations in the timing chart of FIG. 6 described in Embodiment 1 are performed.

Note that FIG. 9 shows a structure in which scanning of selection signals and light emission of the light sources in the backlight are not performed; however, it is possible to perform scanning of selection signals and to input a video signal used for not transmitting light to each pixel.

Figure 10A:
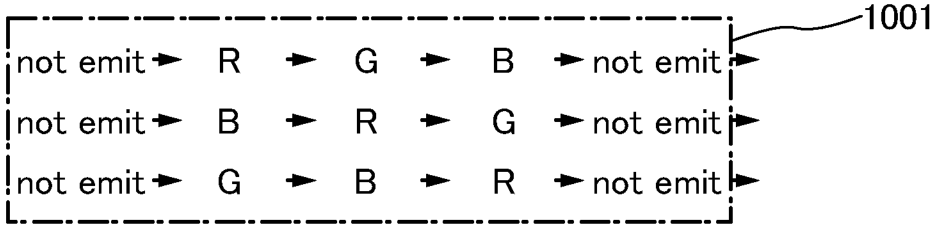
FIGS. 10A to 10C are diagrams illustrating sequence of light emission of a backlight, according to embodiments of the present invention.
Figure 10B:
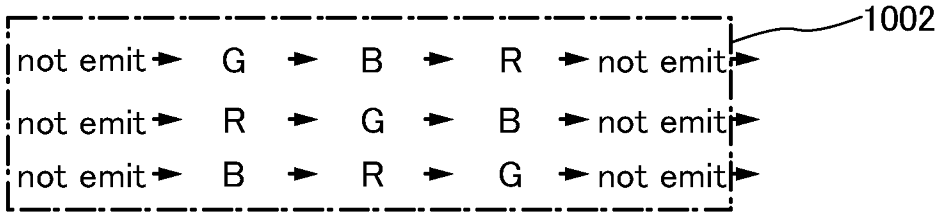
Figure 10C:
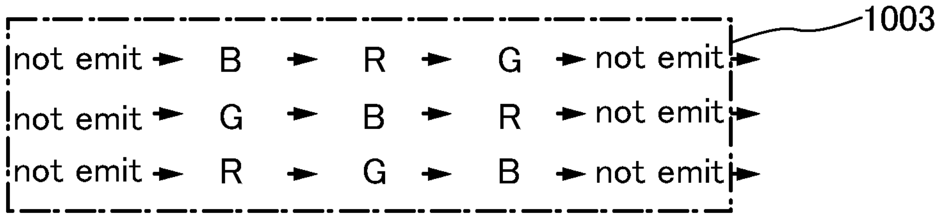

The sequence of input of the video signals depending on a random number signal from the random number generation circuit 186 and the sequence of light emission of the backlight depending on the video signals in a certain period are explained in FIGS. 10A to 10C, as explained in FIGS. 7C to 7E with reference to FIGS. 7A and 7B.

The sequence determination circuit 185 in FIG. 1 described in Embodiment 1 determines the sequence of input of the RGB video signals in a period shown in FIGS. 10A to 10C in accordance with a signal from the random number generation circuit 186 (also referred to as a random number signal) and the sequence of light emission of the backlight in the frame period in accordance with the video signals.

For example, the sequence of input of the video signals depending on a random number signal from the random number generation circuit 186 and the sequence of light emission of the backlight depending on the video signals in a certain period are illustrated without illustration of input of the video signals, as in FIG. 7B. Thus, as illustrated in FIG. 10A, in a certain period, in the pixels in the first to the k-th rows, light is not emitted first, red (R) light, green (G) light, and blue (B) light are sequentially emitted, and then light is not emitted; in the pixels in the (n+1)-th to the (n+k)-th rows, light is not emitted first, blue (B) light, red (R) light, and green (G) light are sequentially emitted, and then light is not emitted; and in the pixels in the (2n+1)-th to the (2n+k)-th rows, light is not emitted first, green (G) light, blue (B) light, and red (R) light are sequentially emitted, and then light is not emitted. A period indicated by an alternate long and short dashed line 1001 is one frame period.

Further, the sequence of input of the video signals depending on a random number signal from the random number generation circuit 186 and the sequence of light emission of the backlight depending on the video signals in a period different from the period in FIG. 10A are illustrated without illustration of input of the video signals, as in FIG. 7B. Thus, as illustrated in FIG. 10B, in a certain period, in the pixels in the first to the k-th rows, light is not emitted first, green (G) light, blue (B) light, and red (R) light are sequentially emitted, and then light is not emitted; in the pixels in the (n+1)-th to the (n+k)-th rows, light is not emitted first, red (R) light, green (G) light, and blue (B) light are sequentially emitted, and then light is not emitted; and in the pixels in the (2n+1)-th to the (2n+k)-th rows, light is not emitted first, blue (B) light, red (R) light, and green (G) light are sequentially emitted, and then light is not emitted. A period indicated by an alternate long and short dashed line 1002 is one frame period.

Further, the sequence of input of the video signals depending on a random number signal from the random number generation circuit 186 and the sequence of light emission of the backlight depending on the video signals in a period different from the periods in FIGS. 10A and 10B are illustrated without illustration of input of the video signals, as in FIG. 7B. Thus, as illustrated in FIG. 10C, in a certain period, in the pixels in the first to the k-th rows, light is not emitted first, blue (B) light, red (R) light, and green (G) light are sequentially emitted, and then light is not emitted; in the pixels in the (n+1)-th to the (n+k)-th rows, light is not emitted first, green (G) light, blue (B) light, and red (R) light are sequentially emitted, and then light is not emitted; and in the pixels in the (2n+1)-th to the (2n+k)-th rows, light is not emitted first, red (R) light, green (G) light, and blue (B) light are sequentially emitted, and then light is not emitted. A period indicated by an alternate long and short dashed line 1003 is one frame period.

Besides the sequence of input of the video signals and the sequence of light emission of the backlight depending on the video signals which are illustrated in FIGS. 10A to 10C, the sequence of light emission of the light sources in one frame period, which can be determined in accordance with a random number signal from the random number generation circuit 186, and the sequence of input of the video signals depending on the sequence of light emission of the light sources in the frame period are given below. In the pixels in the first to the k-th rows, light is not emitted first, red (R) light, blue (B) light, and green (G) light are sequentially emitted, and then light is not emitted; in the pixels in the (n+1)-th to the (n+k)-th rows, light is not emitted first, green (G) light, red (R) light, and blue (B) light are sequentially emitted, and then light is not emitted; and in the pixels in the (2n+1)-th to the (2n+k)-th rows, light is not emitted first, blue (B) light, green (G) light, and red (R) light are sequentially emitted, and then light is not emitted. In another frame period, in the pixels in the first to the k-th rows, light is not emitted first, green (G) light, red (R) light, and blue (B) light are sequentially emitted, and then light is not emitted; in the pixels in the (n+1)-th to the (n+k)-th rows, light is not emitted first, blue (B) light, green (G) light, and red (R) light are sequentially emitted, and then light is not emitted; and in the pixels in the (2n+1)-th to the (2n+k)-th rows, light is not emitted first, red (R) light, blue (B) light, and green (G) light are sequentially emitted, and then light is not emitted. In still another frame period, in the pixels in the first to the k-th rows, light is not emitted first, blue (B) light, green (G) light, and red (R) light are sequentially emitted, and then light is not emitted; in the pixels in the (n+1)-th to the (n+k)-th rows, light is not emitted first, red (R) light, blue (B) light, and green (G) light are sequentially emitted, and then light is not emitted; and in the pixels in the (2n+1)-th to the (2n+k)-th rows, light is not emitted first, green (G) light, red (R) light, and blue (B) light are sequentially emitted, and then light is not emitted.

Figures 11A, 11B, 11C:
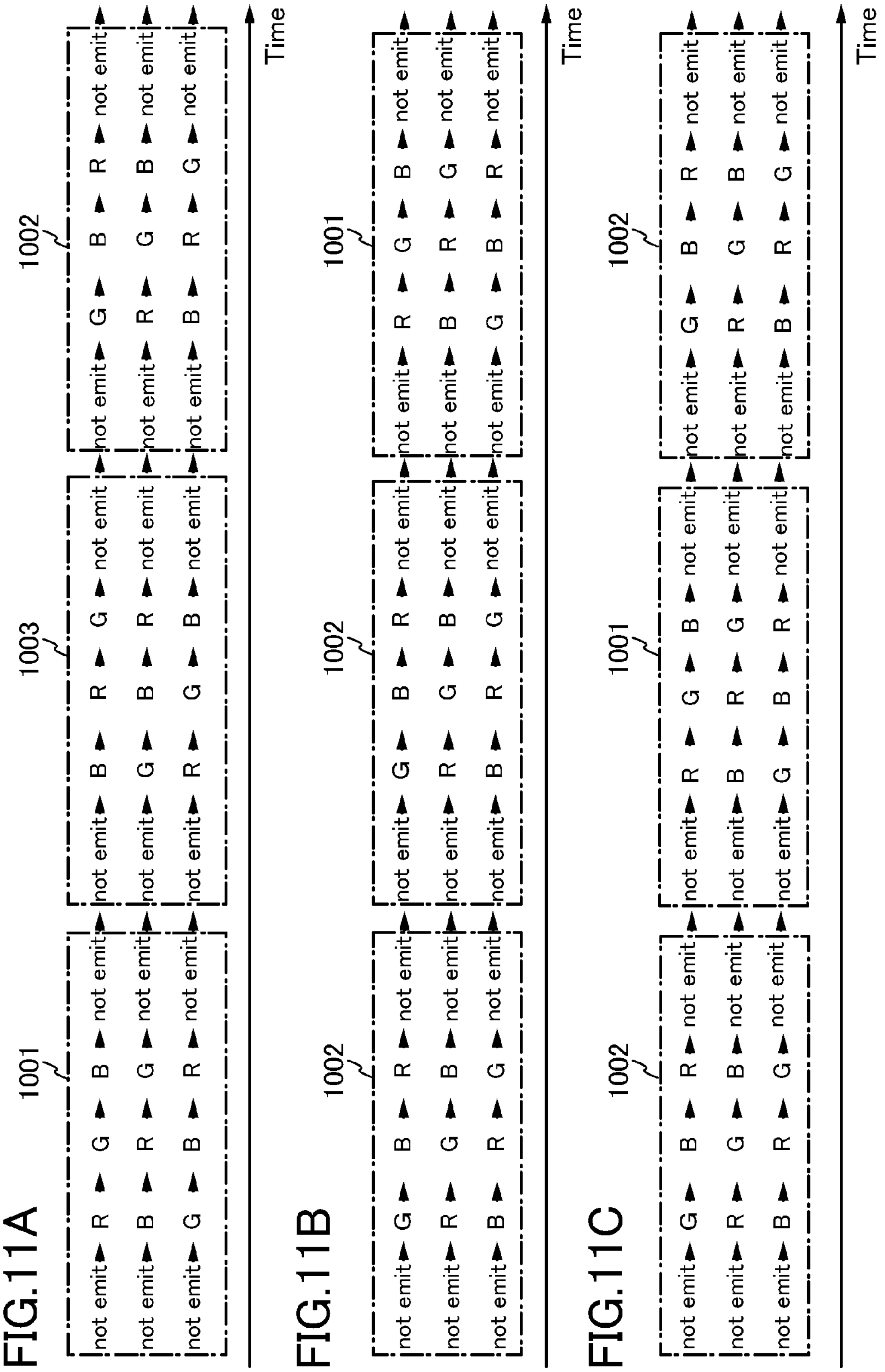
FIGS. 11A to 11C are diagrams illustrating sequence of light emission of a backlight, according to embodiments of the present invention.

As for the sequence of input of the video signals depending on a random number signal from the random number generation circuit 186 and the sequence of light emission of the backlight depending on the video signals, the sequence of light emission of the light sources in one frame period, which is illustrated in FIGS. 10A to 10C, and the sequence of input of the video signals depending on the sequence of light emission of the light sources in the frame period are determined not in a particular order but at random. For example, as illustrated in FIG. 11A, a certain period sequentially includes the frame period indicated by the alternate long and short dashed line 1001, the frame period indicated by the alternate long and short dashed line 1003, and the frame period indicated by the alternate long and short dashed line 1002. As illustrated in FIG. 11B, another period sequentially includes the frame period indicated by the alternate long and short dashed line 1002, the frame period indicated by the alternate long and short dashed line 1002, and the frame period indicated by the alternate long and short dashed line 1001. As illustrated in FIG. 11C, still another period sequentially includes the frame period indicated by the alternate long and short dashed line 1002, the frame period indicated by the alternate long and short dashed line 1001, and the frame period indicated by the alternate long and short dashed line 1002.

Therefore, in the structure according to this embodiment, the sequence of input of the video signals depending on a random number signal from the random number generation circuit 186 and the sequence of light emission of the backlight depending on the video signals are determined at random. As illustrated in FIGS. 11A to 11C, the sequence of input of the video signals and the sequence of light emission of the backlight in one frame period are determined at random. Thus, perception of color breakup can be suppressed as compared to color images displayed by a field sequential method in which the sequence of input of the video signals and the sequence of light emission of the backlight depending on the video signals are regularly arranged. In particular, with the structure according to this embodiment, where there are periods in each of which the light sources of the backlight do not emit light before and after one frame period, the length of a period in which light is emitted from the backlight is shortened; thus, it is possible to further suppress color breakup.

This embodiment can be implemented in appropriate combination with any of the structures described in the other embodiments.

Embodiment 3

In this embodiment, examples of a transistor that can be applied to a liquid crystal display device disclosed in this specification will be described. There is no particular limitation on the structure of the transistor that can be applied to the liquid crystal display device disclosed in this specification. For example, a staggered transistor, a planar transistor, or the like having a top-gate structure in which a gate electrode is placed over a semiconductor layer with a gate insulating layer provided therebetween or a bottom-gate structure in which a gate electrode is placed below a semiconductor layer with a gate insulating layer provided therebetween, can be used. Further, the transistor may have a single gate structure including one channel formation region, a double gate structure including two channel formation regions, or a triple gate structure including three channel formation regions. Alternatively, the transistor may have a dual gate structure including two gate electrode layers positioned over and below a channel region with a gate insulating layer provided therebetween. FIGS. 12A to 12D each illustrate an example of a cross-sectional structure of a transistor.

Figure 12A:
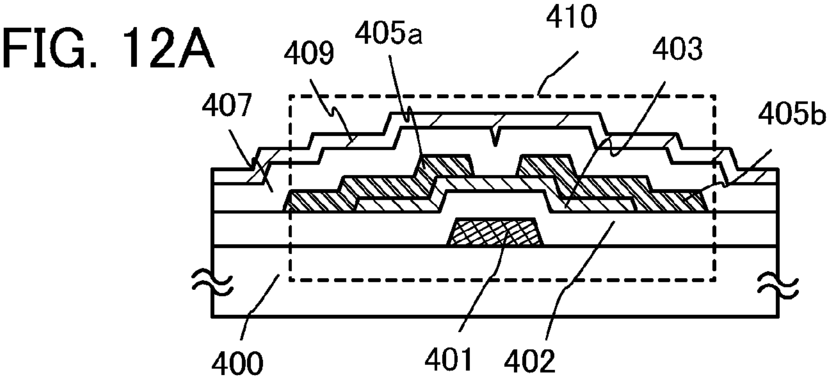
FIGS. 12A to 12D are cross-sectional views each illustrating an example of a transistor which can be applied to one embodiment of the present invention.

A transistor 410 in FIG. 12A is one of bottom-gate transistors and is also referred to as an inverted staggered transistor.

The transistor 410 includes, over a substrate 400 having an insulating surface, a gate electrode layer 401, a gate insulating layer 402, a semiconductor layer 403, a source electrode layer 405*a*, and a drain electrode layer 405*b*. In addition, the insulating film 407 which covers the transistor 410 and is in contact with the semiconductor layer 403 is provided. A protective insulating layer 409 is formed over the insulating film 407.

Figure 12B:
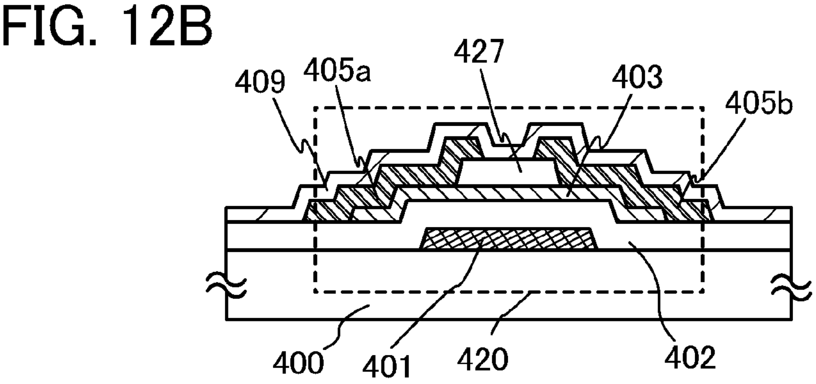

A transistor 420 in FIG. 12B is one of bottom-gate transistors referred to as a channel-protective type (also referred to as a channel-stop type) and is also referred to as an inverted staggered transistor.

The transistor 420 includes, over the substrate 400 having an insulating surface, the gate electrode layer 401, the gate insulating layer 402, the semiconductor layer 403, an insulating film 427 which functions as a channel protective layer covering a channel formation region of the semiconductor layer 403, the source electrode layer 405*a*, and the drain electrode layer 405*b*. Further, the protective insulating layer 409 is formed so as to cover the transistor 420.

Figure 12C:
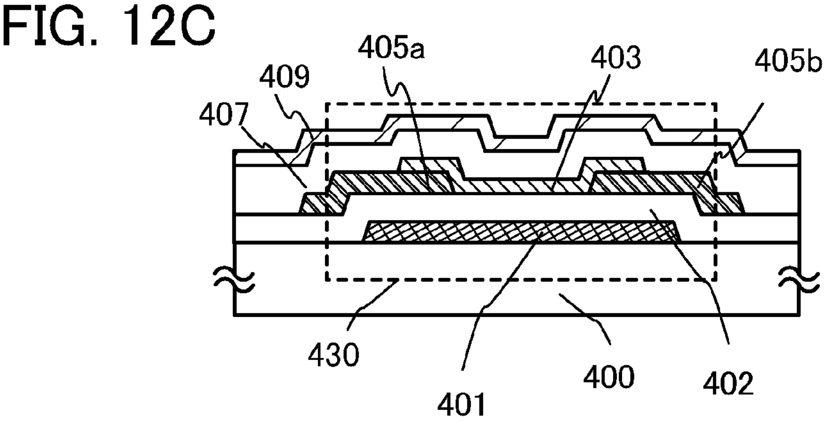

A transistor 430 in FIG. 12C is a bottom-gate transistor and includes, over the substrate 400 having an insulating surface, the gate electrode layer 401, the gate insulating layer 402, the source electrode layer 405*a*, the drain electrode layer 405*b*, and the semiconductor layer 403. In addition, the insulating film 407 which covers the transistor 430 and is in contact with the semiconductor layer 403 is provided. The protective insulating layer 409 is formed over the insulating film 407.

In the transistor 430, the gate insulating layer 402 is provided over and in contact with the substrate 400 and the gate electrode layer 401; the source electrode layer 405*a* and the drain electrode layer 405*b* are provided over and in contact with the gate insulating layer 402. Further, the semiconductor layer 403 is provided over the gate insulating layer 402, the source electrode layer 405*a*, and the drain electrode layer 405*b*.

Figure 12D:
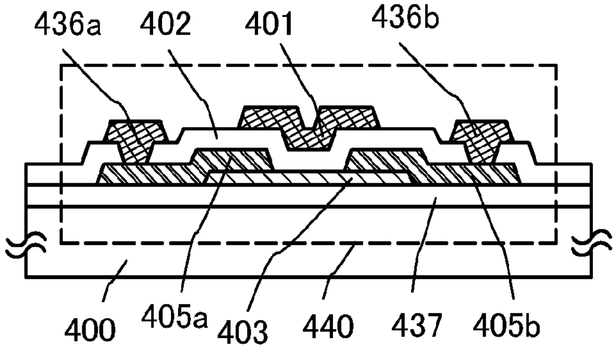

A transistor 440 in FIG. 12D is one of top-gate transistors. The transistor 440 includes, over the substrate 400 having an insulating surface, an insulating layer 437, the semiconductor layer 403, the source electrode layer 405*a*, the drain electrode layer 405*b*, the gate insulating layer 402, and the gate electrode layer 401. A wiring layer 436*a* and a wiring layer 436*b* are formed in contact with and are connected to the source electrode layer 405*a* and the drain electrode layer 405*b*, respectively.

As a semiconductor material of the semiconductor layer 403, amorphous silicon, microcrystalline silicon, polysilicon, an oxide semiconductor, an organic semiconductor, or the like can be used.

There is no particular limitation on a substrate that can be used as the substrate 400 having an insulating surface; a glass substrate made of barium borosilicate glass, aluminoborosilicate glass, or the like is used.

In the bottom-gate transistors 410, 420, and 430, an insulating film serving as a base film may be provided between the substrate and the gate electrode layer. The base film has a function of preventing diffusion of an impurity element from the substrate, and can be formed to have a single-layer structure or a layered structure using one or more of a silicon nitride film, a silicon oxide film, a silicon nitride oxide film, and a silicon oxynitride film.

The gate electrode layer 401 may be formed to have a single-layer structure or a layered structure using any of metal materials such as molybdenum, titanium, chromium, tantalum, tungsten, aluminum, copper, neodymium, and scandium, and an alloy material containing any of these materials as its main component.

The gate insulating layer 402 can be formed to have a single-layer or layered structure using any of a silicon oxide layer, a silicon nitride layer, a silicon oxynitride layer, a silicon nitride oxide layer, an aluminum oxide layer, an aluminum nitride layer, an aluminum oxynitride layer, an aluminum nitride oxide layer, and a hafnium oxide layer by a plasma CVD method, a sputtering method, or the like. For example, by a plasma CVD method, a silicon nitride layer ($SiN_y$ (y>0)) with a thickness of 50 nm or more and 200 nm or less is formed as a first gate insulating layer, and a silicon oxide layer ($SiO_x$ (x>0)) with a thickness of 5 nm or more and 300 nm or less is formed as a second gate insulating layer over the first gate insulating layer, so that a gate insulating layer with a total thickness of 200 nm is formed.

As a conductive film used for the source electrode layer 405*a* and the drain electrode layer 405*b*, for example, a metal film containing an element selected from Al, Cr, Cu, Ta, Ti, Mo, and W, or a metal nitride film containing any of the above elements as its component (a titanium nitride film, a molybdenum nitride film, a tungsten nitride film, or the like) can be used. Alternatively, a structure may be employed in which a high-melting-point metal film of Ti, Mo, W, or the like or a metal nitride film of any of these elements (a titanium nitride film, a molybdenum nitride film, or a tungsten nitride film) may be provided over and/or below a metal layer of Al, Cu, or the like.

A material similar to that of the source electrode layer 405*a* and the drain electrode layer 405*b* can be used for a conductive film such as the wiring layer 436*a* and the wiring layer 436*b* which are connected to the source electrode layer 405*a* and the drain electrode layer 405*b*, respectively.

Alternatively, the conductive film to be the source electrode layer 405*a* and drain electrode layer 405*b* (including a wiring layer formed in the same layer as the source and drain electrode layers) may be formed using a conductive metal oxide. As the conductive metal oxide, indium oxide ($In_2O_3$), tin oxide ($SnO_2$), zinc oxide (ZnO), an indium oxide-tin oxide alloy ($In_2O_3$—$SnO_2$, abbreviated to ITO), an indium oxide-zinc oxide alloy ($In_2O_3$—ZnO), or any of these metal oxide materials containing silicon oxide can be used.

As the insulating films 407 and 427 provided over the semiconductor layer and the insulating layer 437 provided below the semiconductor layer, an inorganic insulating film such as a silicon oxide film, a silicon oxynitride film, an aluminum oxide film, or an aluminum oxynitride film can be typically used.

As the protective insulating layer 409 provided over the semiconductor layer, an inorganic insulating film such as a silicon nitride film, an aluminum nitride film, a silicon nitride oxide film, or an aluminum nitride oxide film can be used.

In addition, a planarization insulating film may be formed over the protective insulating layer 409 in order to reduce surface unevenness due to the transistor. As the planarization insulating film, an organic material such as a polyimide resin, an acrylic resin, or a benzocyclobutene resin can be used. Other than such organic materials, it is also possible to use a low-dielectric constant material (a low-k material) or the like.

Note that the planarization insulating film may be formed by stacking a plurality of insulating films formed using any of these materials.

This embodiment can be implemented in appropriate combination with any of the structures described in the other embodiments.

Embodiment 4

In the examples of the transistors described in Embodiment 3, it is important to shield the transistor from light in the case where an oxide semiconductor is used as a semiconductor material of the semiconductor layer 403. Thus, in this embodiment, an example of a structure in which the transistor can be shielded from light will be described with reference to a plan view and a cross-sectional view of a pixel included in a liquid crystal display device, which are an example. As the oxide semiconductor, a material represented by the chemical formula, $InMO_3(ZnO)_m$ (m>0) is used. Here, M represents one or more metal elements selected from Ga, Al, Mn, Sn, and Co. For example, M can be Ga, Ga and Al, Ga and Mn, Ga and Co, or the like.

Figure 15A:
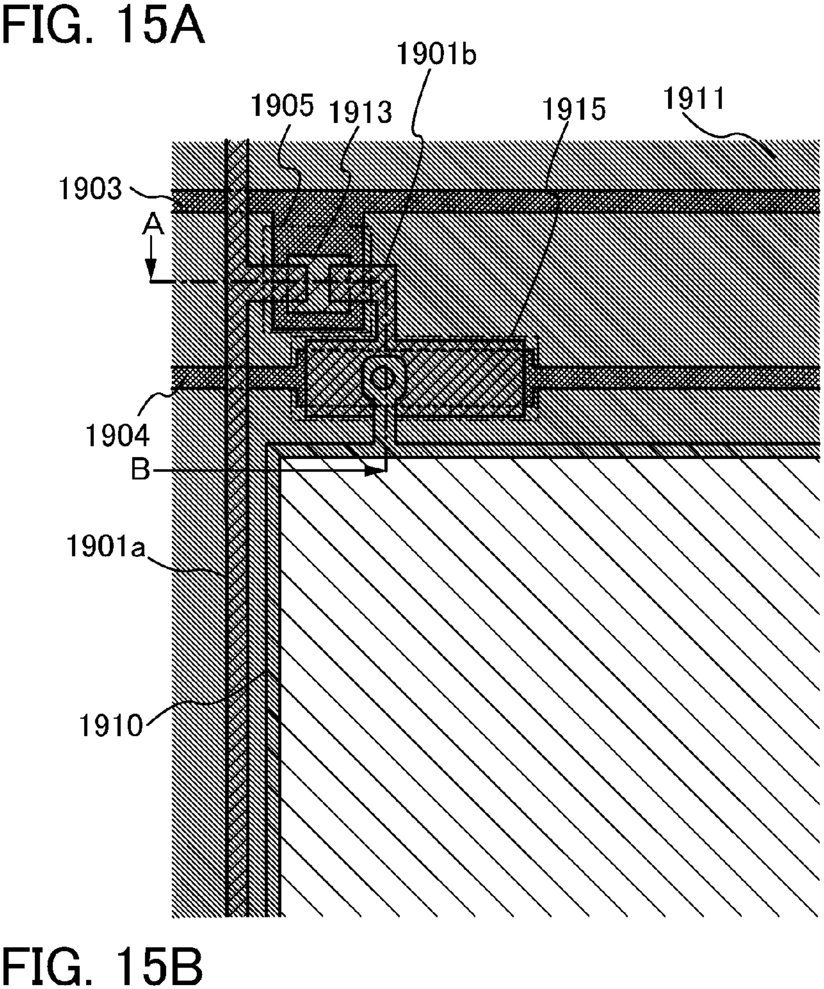
FIGS. 15A and 15B are a plan view and a cross-sectional view according to one embodiment of the present invention, respectively.
Figure 15B:
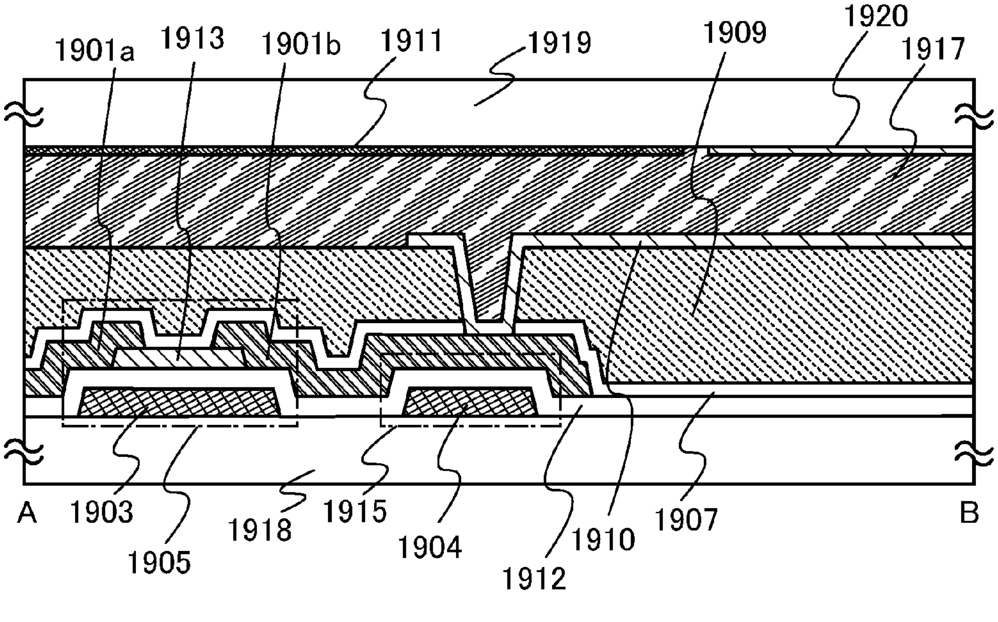

FIG. 15A is an example of a plan view of a pixel. FIG. 15B is a cross-sectional view along alternate long and short dashed line A-B in FIG. 15A.

In FIG. 15A, a signal line formed of the same wiring layer as a drain electrode layer 1901*b* and including a source electrode layer 1901*a* is provided to extend in a longitudinal direction (column direction). Wiring layers (including a gate electrode layer 1903) serving as scan lines extend in the direction approximately orthogonal to the source electrode layer 1901*a* (in the horizontal direction (row direction) in the diagram). A capacitor wiring layer 1904 extends in the direction approximately parallel to the gate electrode layer 1903 and in the direction approximately orthogonal to the source electrode layer 1901*a* (in the horizontal direction (row direction) in the diagram).

In the pixel illustrated in FIGS. 15A and 15B, a transistor 1905 including the gate electrode layer 1903 is provided. A stack of the capacitor wiring layer 1904, the gate insulating layer 1912, and the drain electrode layer 1901*b* forms a capacitor 1915. An insulating film 1907 and an interlayer film 1909 are provided over the transistor 1905. An opening (contact hole) is formed in the insulating film 1907 and the interlayer film 1909 which are over the transistor 1905.

The pixel illustrated in FIGS. 15A and 15B includes a transparent electrode layer 1910 as an electrode layer connected to the transistor 1905 on the first substrate 1918 side, and a transparent electrode layer 1920 on the second substrate 1919 side. The transparent electrode layer 1910 and the transistor 1905 are connected to each other in the opening (contact hole). The transparent electrode layer 1910 and the transparent electrode layer 1920 overlap with each other with a liquid crystal layer 1917 provided therebetween. A light blocking layer 1911 (black matrix) is provided on the second substrate 1919 side in a region where the transparent electrode layer 1910 and the transparent electrode layer 1920 do not overlap with each other.

The transistor 1905 in FIGS. 15A and 15B includes a semiconductor layer 1913 formed over the gate electrode layer 1903 with the gate insulating layer 1912 provided therebetween; and the source electrode layer 1901*a* and the drain electrode layer 1901*b* which are in contact with the semiconductor layer 1913.

An insulating material containing oxygen and a Group 13 element is preferably used for an insulating layer (the gate insulating layer 1912 and the insulating film 1907 in this embodiment) in contact with the semiconductor layer 1913 including an oxide semiconductor (the semiconductor layer is also referred to as an oxide semiconductor). Many of oxide semiconductor materials include Group 13 elements, and an insulating material containing a Group 13 element is compatible with an oxide semiconductor. Thus, when an insulating material containing a Group 13 element is used for an insulating layer in contact with an oxide semiconductor, the state of the interface with the oxide semiconductor can be kept well.

An insulating material containing a Group 13 element refers to an insulating material containing one or more Group 13 elements. As the insulating material containing a Group 13 element, a gallium oxide, an aluminum oxide, an aluminum gallium oxide, a gallium aluminum oxide, and the like are given. Here, an aluminum gallium oxide contains gallium and aluminum so that the aluminum content is higher than the gallium content in atomic percent, and a gallium aluminum oxide contains gallium and aluminum so that the gallium content is higher than the aluminum content in atomic percent.

For example, in the case of forming an insulating layer in contact with an oxide semiconductor layer containing gallium, when a material containing a gallium oxide is used for the insulating layer, favorable characteristics can be kept at the interface between the oxide semiconductor layer and the insulating layer. When the oxide semiconductor layer and the insulating layer containing a gallium oxide are provided in contact with each other, pileup of hydrogen at the interface between the oxide semiconductor layer and the insulating layer can be reduced, for example. Note that a similar effect can be obtained in the case where an element belonging to the same group as a constituent element of the oxide semiconductor is used for the insulating layer. For example, it is effective to form an insulating layer with the use of a material containing an aluminum oxide. Note that water is less likely to permeate an aluminum oxide. Thus, it is preferable to use a material containing an aluminum oxide in terms of preventing entry of water to the oxide semiconductor layer.

An insulating material of the insulating layer in contact with the semiconductor layer 1913 including an oxide semiconductor preferably contains oxygen in a proportion higher than that in the stoichiometric composition, by heat treatment in an oxygen atmosphere or oxygen doping. "Oxygen doping" refers to addition of oxygen into a bulk. Note that the term "bulk" is used in order to clarify that oxygen is added not only to a surface of a thin film but also to the inside of the thin film. In addition, "oxygen doping" includes "oxygen plasma doping" in which oxygen in the form of plasma is added to a bulk. The oxygen doping may be performed by an ion implantation method or an ion doping method.

For example, in the case where the insulating layer in contact with the semiconductor layer 1913 including an oxide semiconductor is formed using a gallium oxide, the composition of the gallium oxide can be set to be $Ga_2O_x$ ($x=3+\alpha$, $0<\alpha<1$) by heat treatment in an oxygen atmosphere or oxygen doping.

In the case where the insulating layer in contact with the semiconductor layer 1913 including an oxide semiconductor is formed using an aluminum oxide, the composition of the aluminum oxide can be set to be $Al_2O_x$ ($x=3+\alpha$, $0<\alpha<1$) by heat treatment in an oxygen atmosphere or oxygen doping.

In the case where the insulating film in contact with the semiconductor layer 1913 including an oxide semiconductor is formed using a gallium aluminum oxide (aluminum gallium oxide), the composition of the gallium aluminum oxide (aluminum gallium oxide) can be set to be $Ga_xAl_{2-x}O_{3+\alpha}$ ($0<x<2$, $0<\alpha<1$) by heat treatment in an oxygen atmosphere or oxygen doping.

By oxygen doping, an insulating layer including a region where the proportion of oxygen is higher than that in the stoichiometric composition can be formed. When the insulating layer including such a region is in contact with the oxide semiconductor layer, oxygen that exists excessively in the insulating layer is supplied to the oxide semiconductor layer, and oxygen deficiency in the oxide semiconductor layer or at the interface between the oxide semiconductor layer and the insulating layer is reduced. Thus, the oxide semiconductor layer can be an i-type or substantially i-type oxide semiconductor.

The insulating layer including a region where the proportion of oxygen is higher than that in the stoichiometric composition may be applied to either the insulating layer positioned over the semiconductor layer 1913 including an oxide semiconductor or the insulating layer positioned below the semiconductor layer 1913 including an oxide semiconductor of the insulating layers in contact with the semiconductor layer 1913 including an oxide semiconductor; however, it is preferable to apply such an insulating layer to both of the insulating layers. The aforementioned effect can be enhanced with a structure where the insulating layers each including a region where the proportion of oxygen is higher than that in the stoichiometric composition are used as the insulating layers which are in contact with and over and below the semiconductor layer 1913 including an oxide semiconductor, in order that the semiconductor layer 1913 including an oxide semiconductor is sandwiched between the insulating layers.

The insulating layers over and below the semiconductor layer 1913 including an oxide semiconductor may include the same constituent element or different constituent elements. For example, the insulating layers over and below the semiconductor layer 1913 including an oxide semiconductor may be both formed using a gallium oxide whose composition is $Ga_2O_x$ ($x=3+\alpha$, $0<\alpha<1$). Alternatively, one of the insulating layers over and below the semiconductor layer 1913 including an oxide semiconductor may be formed using $Ga_2O_x$ ($x=3+\alpha$, $0<\alpha<1$) and the other may be formed using an aluminum oxide whose composition is $Al_2O_x$ ($x=3+\alpha$, $0<\alpha<1$).

The insulating layer in contact with the semiconductor layer 1913 including an oxide semiconductor may be formed by stacking insulating layers each including a region where the proportion of oxygen is higher than that in the stoichiometric composition. For example, the insulating layer over the semiconductor layer 1913 including an oxide semiconductor may be formed as follows: a gallium oxide whose composition is $Ga_2O_x$ ($x=3+\alpha$, $0<\alpha<1$) is formed and a gallium aluminum oxide (aluminum gallium oxide) whose composition is $Ga_xAl_{2-x}O_{3+\alpha}$ ($0<x<2$, $0<\alpha<1$) may be formed thereover. Note that the insulating layer below the semiconductor layer 1913 including an oxide semiconductor may be formed by stacking insulating layers each including a region where the proportion of oxygen is higher than that in the stoichiometric composition. Further, both of the insulating layers over and below the semiconductor layer 1913 including an oxide semiconductor may be formed by stacking insulating layers each including a region where the proportion of oxygen is higher than that in the stoichiometric composition.

Further, in the plan view of FIG. 15A, the gate electrode layer 1903 is provided so as to overlap with the lower side of the semiconductor layer 1913 and the light-blocking layer 1911 is provided so as to cover the upper side of the semiconductor layer 1913. Thus, the transistor 1905 can be shielded from light from the upper side and the lower side. Blocking of light results in suppression of degradation of transistor characteristics.

Figure 16A:
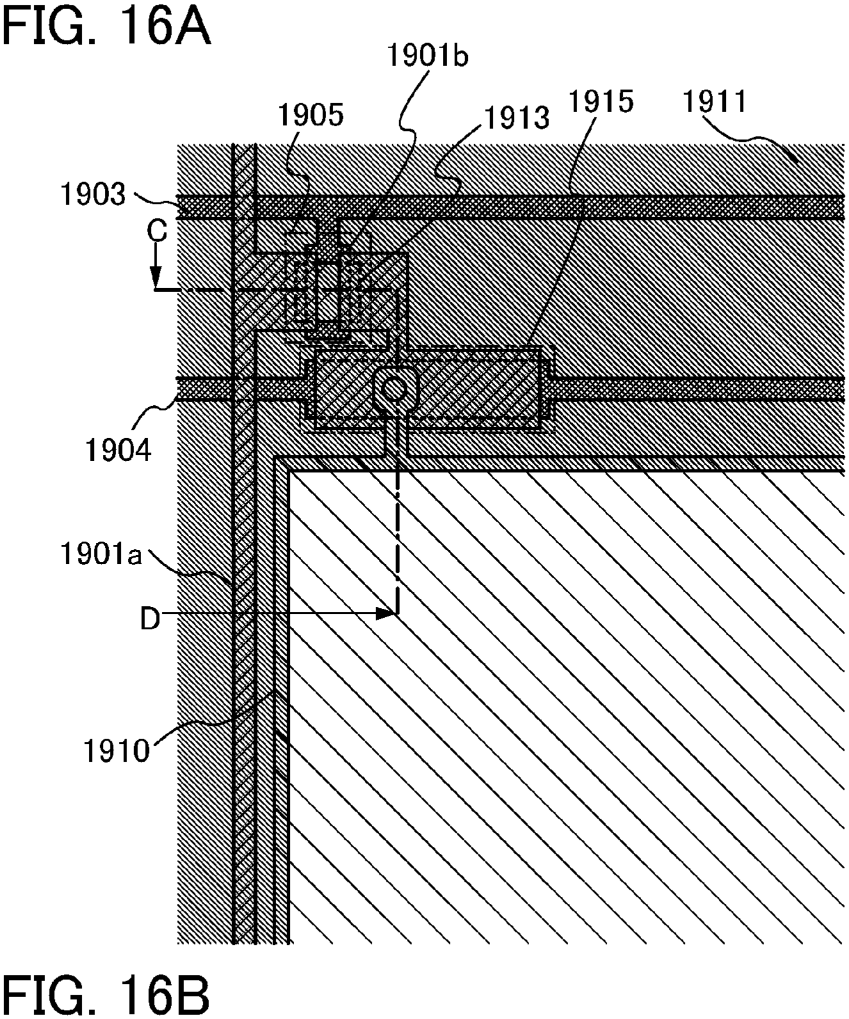
FIGS. 16A and 16B are a plan view and a cross-sectional view according to one embodiment of the present invention, respectively.
Figure 16B:
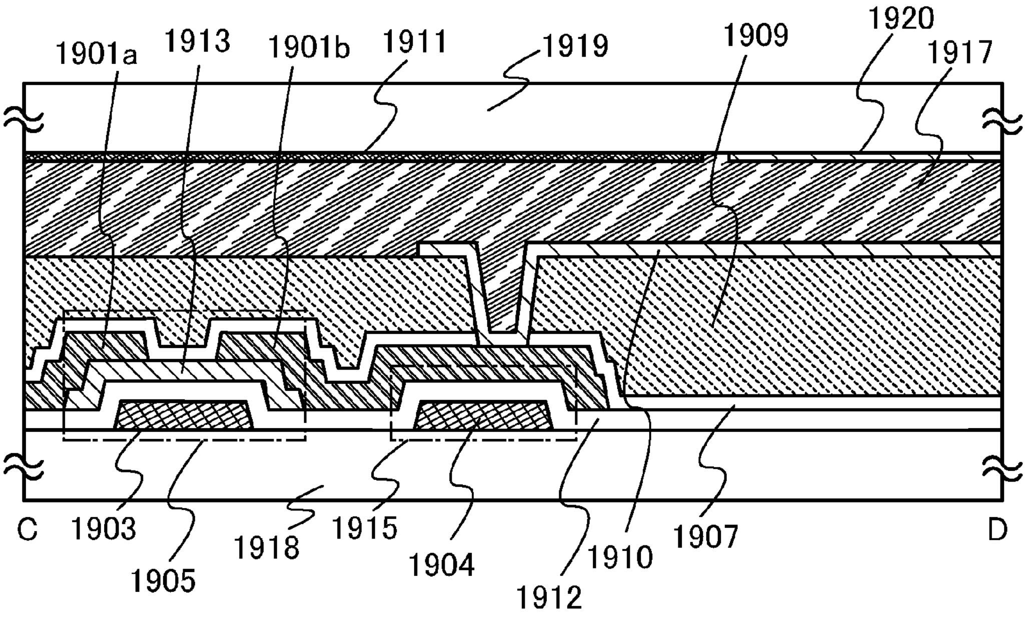

Next, FIG. 16A is an example of a plan view illustrating a pixel different from that in FIG. 15A. FIG. 16B is a cross-sectional view along alternate long and short dashed line C-D in FIG. 16A. Note that reference numerals of components in FIGS. 16A and 16B are the same as those in FIGS. 15A and 15B and thus description thereof will be omitted.

A structure in the plan view and the cross-sectional view of FIGS. 16A and 16B is different from that of FIGS. 15A and 15B in that the source electrode layer 1901*a* and the drain electrode layer 1901*b* are provided so as to cover regions of the semiconductor layer 1913 except a channel formation region. Accordingly, the transistor 1905 can be shielded from light also at end portions of the semiconductor layer 1913. Blocking of light results in suppression of degradation of transistor characteristics.

Figure 17A:
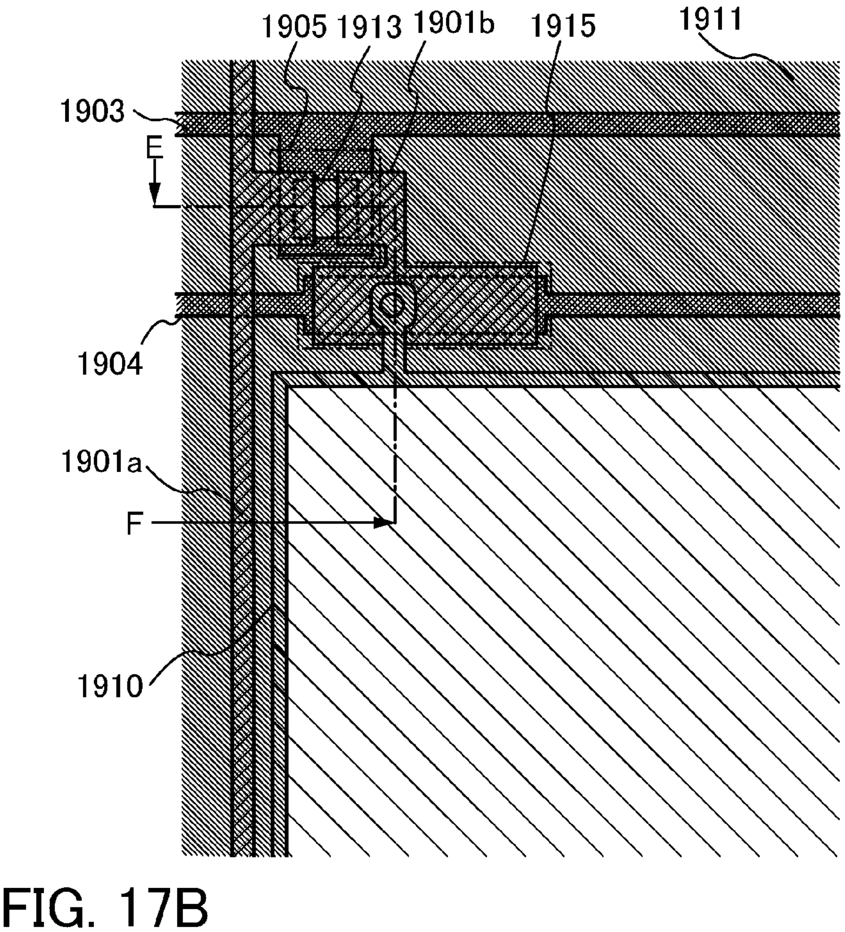
FIGS. 17A and 17B are a plan view and a cross-sectional view according to one embodiment of the present invention, respectively.
Figure 17B:
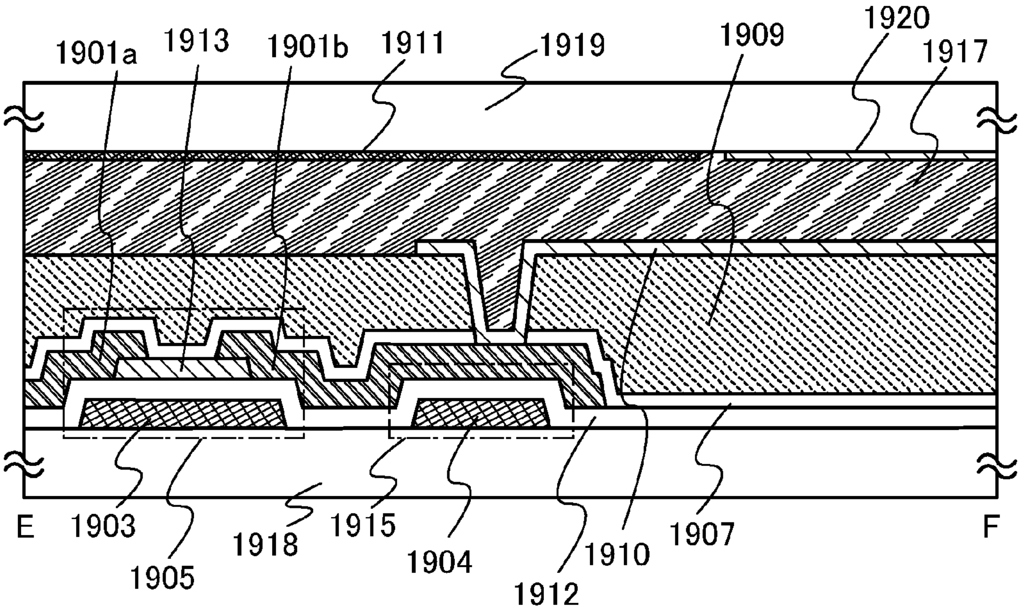

Next, FIG. 17A is an example of a plan view illustrating a pixel different from those in FIG. 15A and FIG. 16A. FIG. 17B is a cross-sectional view along alternate long and short dashed line E-F in FIG. 17A. Note that reference numerals of components in FIGS. 17A and 17B are the same as those in FIGS. 15A and 15B and thus description thereof will be omitted.

A structure in the plan view and the cross-sectional view of FIGS. 17A and 17B is similar to that of FIGS. 15A and 15B in that the gate electrode layer 1903 is provided so as to overlap with the lower side of the semiconductor layer 1913 and the light-blocking layer 1911 is provided so as to cover the upper side of the semiconductor layer 1913. In addition, the structure in the plan view and the cross-sectional view of FIGS. 17A and 17B is similar to that of FIGS. 16A and 16B in that the source electrode layer 1901*a* and the drain electrode layer 1901*b* are provided so as to cover regions of the semiconductor layer 1913 except a channel formation region. Accordingly, the transistor 1905 can be shielded from light from the upper side and the lower side and at end portions of the semiconductor layer 1913. Blocking of light results in suppression of degradation of transistor characteristics.

This embodiment can be implemented in appropriate combination with any of the structures described in the other embodiments.

Embodiment 5

In this embodiment, an example of a substrate used in a liquid crystal display device according to one embodiment of the present invention will be described.

Figure 20A:
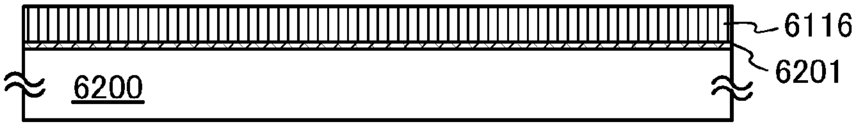

First, a layer 6116 to be separated is formed over a formation substrate 6200 with a separation layer 6201 provided therebetween (see FIG. 20A).

The formation substrate 6200 may be a quartz substrate, a sapphire substrate, a ceramic substrate, a glass substrate, a metal substrate, or the like. Note that such a substrate which is not thin enough to be definitely flexible enables precise formation of an element such as a transistor. "Not definitely flexible" means that the elastic modulus of the substrate is higher than or equivalent to that of a glass substrate used in generally fabricating a liquid crystal display.

The separation layer 6201 is formed to have a single-layer or layered structure using any of elements selected from tungsten (W), molybdenum (Mo), titanium (Ti), tantalum (Ta), niobium (Nb), nickel (Ni), cobalt (Co), zirconium (Zr), zinc (Zn), ruthenium (Ru), rhodium (Rh), palladium (Pd), osmium (Os), iridium (Ir), and silicon (Si), an alloy material containing any of the above elements as its main component, and a compound material containing any of the above elements as its main component by a sputtering method, a plasma CVD method, an application method, a printing method, or the like.

When the separation layer 6201 has a single-layer structure, a tungsten layer, a molybdenum layer, or a layer containing a mixture of tungsten and molybdenum is preferably formed. Alternatively, a layer containing an oxide or an oxynitride of tungsten, a layer containing an oxide or an oxynitride of molybdenum, or a layer containing an oxide or an oxynitride of a mixture of tungsten and molybdenum is formed. Note that the mixture of tungsten and molybdenum corresponds to an alloy of tungsten and molybdenum, for example.

In the case where the separation layer 6201 has a layered structure, it is preferable that a metal layer and a metal oxide layer be formed as a first layer and a second layer, respectively. Typically, it is preferable to form a tungsten layer, a molybdenum layer, or a layer containing mixture of tungsten and molybdenum as the first layer and to form an oxide, a nitride, an oxynitride, or a nitride oxide of tungsten, molybdenum, or mixture of tungsten and molybdenum as the second layer. When the metal oxide layer is formed as the second layer, an oxide layer (such as a silicon oxide which can be utilized as an insulating layer) may be formed on the metal layer as the first layer so that an oxide of the metal is formed on a surface of the metal layer.

The layer 6116 to be separated is provided with components necessary for an element substrate, such as a transistor, an interlayer insulating film, a wiring, and a pixel electrode, and depending on a case, a common electrode, a color filter, a black matrix, or an alignment film. Such components can be normally formed over the separation layer 6201. Thus, the transistor and the electrode can be formed precisely using a known material and a known method.

Figure 20B:
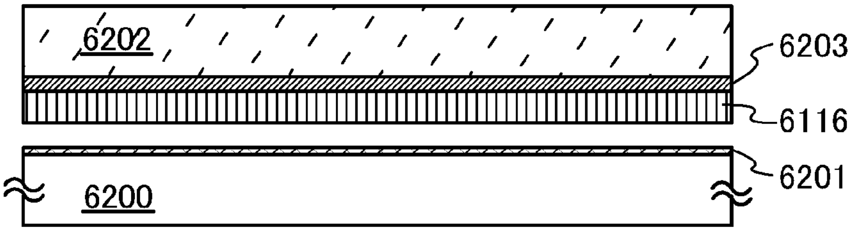
Figure 20B:
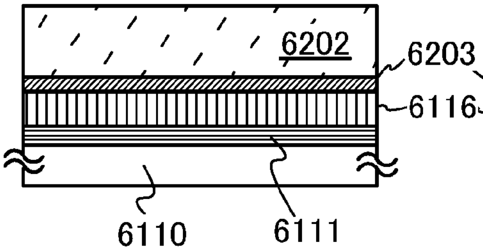
Figure 20B:
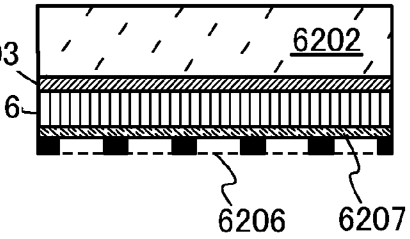
Figure 20B:
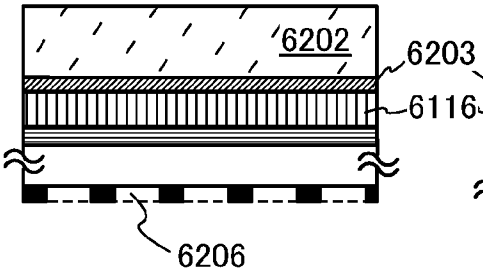
Figure 20B:
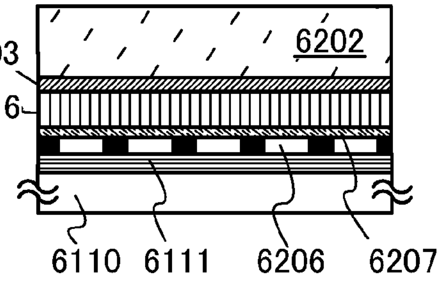
Figure 20B:
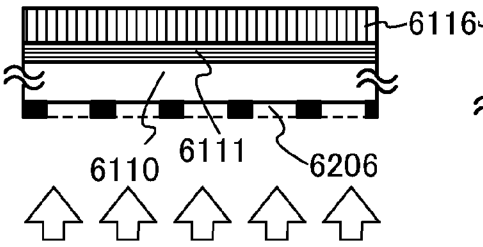
Figure 20B:
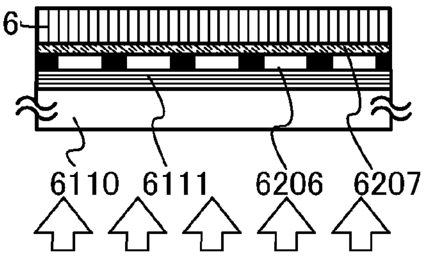

Next, the layer 6116 to be separated is bonded to a temporary supporting substrate 6202 with the use of an adhesive 6203 for separation and then, the layer 6116 to be separated is separated from the separation layer 6201 over the formation substrate 6200 to be transferred (see FIG. 20B). Through this process, the layer 6116 to be separated is placed on the temporary supporting substrate side. Note that in this specification, a process for transferring the layer to be separated from the formation substrate to the temporary supporting substrate is referred to as a transfer process.

As the temporary supporting substrate 6202, a glass substrate, a quartz substrate, a sapphire substrate, a ceramic substrate, a metal substrate, or the like can be used. Alternatively, a plastic substrate which can withstand the temperature of the following process may be used.

As the adhesive 6203 for separation which is used here, an adhesive which is soluble in water or a solvent, an adhesive which is capable of being plasticized upon irradiation of UV light, or the like is used so that the temporary supporting substrate 6202 and the layer 6116 to be separated can be chemically or physically separated when necessary.

Any of various methods can be used as appropriate in the process for transferring the layer 6116 to be separated to the temporary supporting substrate 6202. For example, when a film including a metal oxide film is formed as the separation layer 6201 so as to be in contact with the layer 6116 to be separated, the metal oxide film is embrittled by crystallization, whereby the layer 6116 to be separated can be separated from the formation substrate. When an amorphous silicon film containing hydrogen is formed as the separation layer 6201 between the formation substrate 6200 and the layer 6116 to be separated, the amorphous silicon film containing hydrogen is removed by laser light irradiation or etching, so that the layer 6116 to be separated can be separated from the formation substrate 6200. When a film containing nitrogen, oxygen, hydrogen, or the like (for example, an amorphous silicon film containing hydrogen, an alloy film containing hydrogen, an alloy film containing oxygen, or the like) is used as the separation layer 6201, the separation layer 6201 is irradiated with laser light to release the nitrogen, oxygen, or hydrogen contained in the separation layer 6201 as a gas, so that separation between the layer 6116 to be separated and the formation substrate 6200 can be promoted. Alternatively, liquid may be made to penetrate the interface between the separation layer 6201 and the layer 6116 to be separated to cause separation of the layer 6116 to be separated from the formation substrate 6200. Still alternatively, when the separation layer 6201 is formed using tungsten, the separation may be performed while the separation layer 6201 is etched with the use of a mixed solution of ammonia water and a hydrogen peroxide solution.

Further, the separation process can be facilitated by using plural kinds of separation methods described above in combination. That is, the separation can be performed with physical force (by a machine or the like) after performing laser light irradiation on part of the separation layer, etching on part of the separation layer with a gas, a solution, or the like, or mechanical removal of part of the separation layer with a sharp knife, a scalpel, or the like, in order that the separation layer and the layer to be separated can be easily separated from each other. In the case where the separation layer 6201 is formed to have a layered structure of metal and a metal oxide, the layer to be separated can be physically separated easily from the separation layer by using, for example, a groove formed by laser light irradiation or a scratch made by a sharp knife, a scalpel, or the like as a trigger.

Alternatively, the separation may be performed while liquid such as water is poured.

As a method for separating the layer 6116 to be separated from the formation substrate 6200, a method may alternatively be employed in which the formation substrate 6200 over which the layer 6116 to be separated is formed is removed by mechanical polishing or by etching using a solution or a halogen fluoride gas such as $NF_3$, $BrF_3$, or $ClF_3$, or the like. In that case, the separation layer 6201 is not necessarily provided.

Next, a surface of the layer 6116 to be separated or the separation layer 6201, which is exposed due to separation of the layer 6116 to be separated from the formation substrate 6200, is bonded to a transfer substrate 6110 with the use of a first adhesive layer 6111 including an adhesive different from the adhesive 6203 for separation (see FIG. 20C1).

As a material of the first adhesive layer 6111, various curable adhesives, e.g., a light curable adhesive such as a UV curable adhesive, a reactive curable adhesive, a thermal curable adhesive, and an anaerobic adhesive can be used.

As the transfer substrate 6110, various substrates with high toughness, such as an organic resin film and a metal substrate, can be preferably used. Substrates with high toughness have high impact resistance and thus are less likely to be damaged. An organic resin film and a thin metal substrate, which are lightweight, enable significant weight reduction as compared to a general glass substrate. When such a substrate is used, it is possible to fabricate a lightweight display device which is not easily damaged.

In the case of a transmissive or transflective display device, a substrate which has high toughness and transmits visible light may be used as the transfer substrate 6110. As a material of such a substrate, for example, polyester resins such as polyethylene terephthalate (PET) and polyethylene naphthalate (PEN), an acrylic resin such as a polymethyl methacrylate resin, a polyacrylonitrile resin, a polyimide resin, a polycarbonate (PC) resin, a polyethersulfone (PES) resin, a polyamide resin, a cycloolefin resin, a polystyrene resin, a polyamide imide resin, and a polyvinylchloride resin can be given. A substrate made of such an organic resin has high toughness and thus has high impact resistance and is less likely to be damaged. Further, a film of such an organic resin, which is lightweight, enables significant reduction in weight of a display device as compared to a general glass substrate. In that case, the transfer substrate 6110 is preferably further provided with a metal plate 6206 having an opening at least in a portion overlapping with a region where light of each pixel is transmitted. With the above structure, the transfer substrate 6110 which has high toughness and high impact resistance and is less likely to be damaged can be formed while a change in dimension is suppressed. Further, when the thickness of the metal plate 6206 is reduced, the transfer substrate 6110 which is lighter than a general glass substrate can be formed. When such a substrate is used, it is possible to fabricate a lightweight display device which is not easily damaged (see FIG. 20D1).

Figure 21A:
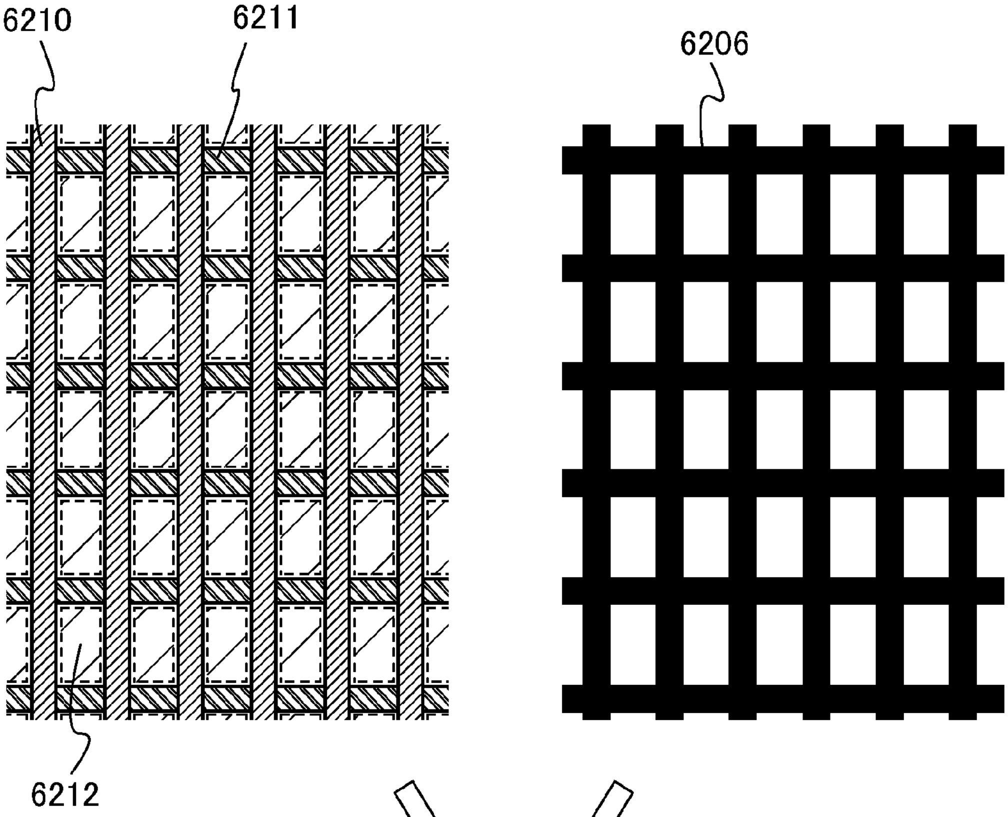
FIGS. 21A and 21B are top views according to one embodiment of the present invention.
Figure 21B:
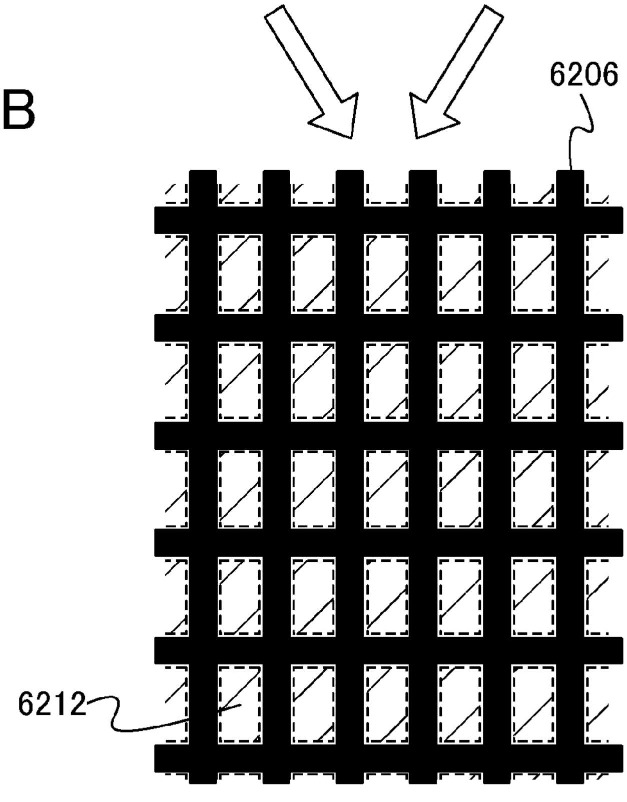

FIG. 21A is an example of a top view of a liquid crystal display device. In the case of a display device in which a first wiring layer 6210 and a second wiring layer 6211 intersect with each other, and a region surrounded by the first wiring layers 6210 and the second wiring layers 6211 is a light-transmitting region 6212 as illustrated in FIG. 21A, the metal plate 6206 having openings formed in a grid so as to leave a portion overlapping with the first wiring layer 6210 and/or the second wiring layer 6211 as in FIG. 21B may be used. Attachment of the metal plate 6206 makes it possible to suppress a change in dimension due to unfavorable alignment or extension of a substrate because of the use of a substrate made of an organic resin. Note that when a polarizing plate (not illustrated) is necessary, the polarizing plate may be provided between the transfer substrate 6110 and the metal plate 6206 or outside the metal plate 6206. The polarizing plate may be attached to the metal plate 6206 in advance. Note that in terms of weight reduction, a substrate which is thin but has dimension stability is preferably used as the metal plate 6206.

After that, the temporary supporting substrate 6202 is separated from the layer 6116 to be separated. Since the adhesive 6203 for separation includes a material capable of separating the temporary supporting substrate 6202 and the layer 6116 to be separated from each other when necessary, the temporary supporting substrate 6202 may be separated by a method depending on the material. Note that light is emitted from the backlight as shown by arrows in the drawing (see FIG. 20E1).

Thus, the layer 6116 to be separated, which is provided with components such as the transistor and the pixel electrode (a common electrode, a color filter, a black matrix, an alignment film, or the like may be provided as necessary), can be formed over the transfer substrate 6110, whereby a lightweight element substrate with high impact resistance can be formed.

Modification Example

The display device having the above structure is one embodiment of the present invention, and the present invention also includes a display device having a structure different from that of the above display device. After the above transfer process (FIG. 20B), the metal plate 6206 may be attached to a surface of the exposed separation layer 6201 or the layer 6116 to be separated before attachment of the transfer substrate 6110 (see FIG. 20C2). In that case, a barrier layer 6207 is preferably provided between the metal plate 6206 and the layer 6116 to be separated so that a contaminant from the metal plate 6206 can be prevented from adversely affecting characteristics of the transistor in the layer 6116 to be separated. In the case of providing the barrier layer 6207, the barrier layer 6207 may be provided over the surface of the exposed separation layer 6201 or the layer 6116 to be separated before attachment of the metal plate 6206. As the barrier layer 6207, a barrier film may be formed using an inorganic material, an organic material, or the like; typically, a silicon nitride and the like can be used. A material of the barrier film is not limited to the above as long as contamination of the transistor can be prevented. The barrier film is formed using a light-transmitting material or formed to a thickness small enough to transmit light so that the barrier film can transmit at least visible light. Note that the metal plate 6206 may be bonded with the use of a second adhesive layer (not illustrated) including an adhesive different from the adhesive 6203 for separation.

After that, the first adhesive layer 6111 is formed over a surface of the metal plate 6206 and the transfer substrate 6110 is attached to the first adhesive layer 6111 (FIG. 20D2) and the temporary supporting substrate 6202 is separated from the layer 6116 to be separated (FIG. 20E2), whereby a lightweight element substrate with high impact resistance can be formed similarly. Note that light is emitted from the backlight as shown by arrows in the drawing.

The lightweight element substrate with high impact resistance formed as described above is firmly attached to a counter substrate with the use of a sealant with a liquid crystal layer provided between the substrates, whereby a lightweight liquid crystal display device with high impact resistance can be manufactured. As the counter substrate, a substrate which has high toughness and transmits visible light (similar to a plastic substrate which can be used as the transfer substrate 6110) can be used. Further, a polarizing plate, a color filter, a black matrix, a common electrode, or an alignment film may be provided as necessary. As a method for forming the liquid crystal layer, a dispenser method, an injection method, or the like can be employed as in the conventional case.

In the case of the lightweight liquid crystal display device with high impact resistance manufactured as described above, a fine element such as the transistor can be formed over a glass substrate or the like which has relatively high dimensional stability, and the conventional manufacturing method can be applied, so that even such a fine element can be formed precisely. Therefore, the lightweight liquid crystal display device with high impact resistance can display images with high precision and high quality.

Further, the liquid crystal display device manufactured as described above may be flexible.

This embodiment can be implemented in appropriate combination with any of the structures described in the other embodiments.

Embodiment 6

A liquid crystal display device disclosed in this specification can be applied to a variety of electronic appliances (including game machines). Examples of electronic appliances are a television set (also referred to as a television or a television receiver), a monitor of a computer or the like, a camera such as a digital camera or a digital video camera, a digital photo frame, a mobile phone handset (also referred to as a mobile phone or a mobile phone device), a portable game machine, a portable information terminal, an audio reproducing device, a large-sized game machine such as a pachinko machine, and the like. Examples of electronic appliances each including the liquid crystal display device described in the above embodiment are described.

Figure 13A:
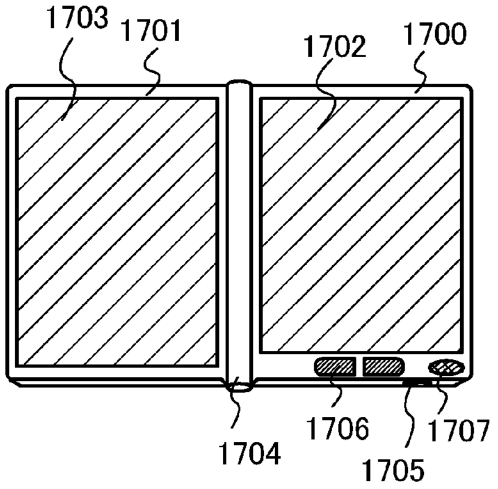
FIGS. 13A to 13D are views each illustrating an electronic appliance according to one embodiment of the present invention.

FIG. 13A illustrates an example of an electronic book reader. The electronic book reader in FIG. 13A includes two housings, a housing 1700 and a housing 1701. The housing 1700 and the housing 1701 are combined with a hinge 1704 so that the electronic book reader can be opened and closed. With such a structure, the electronic book reader can operate like a paper book.

A display portion 1702 and a display portion 1703 are incorporated in the housing 1700 and the housing 1701, respectively. The display portion 1702 and the display portion 1703 may display one image or different images. When the display portion 1702 and the display portion 1703 display different images, for example, text can be displayed on a display portion on the right side (the display portion 1702 in FIG. 13A) and graphics can be displayed on a display portion on the left side (the display portion 1703 in FIG. 13A).

FIG. 13A illustrates an example in which the housing 1700 is provided with an operation portion and the like. For example, the housing 1700 is provided with a power input terminal 1705, operation keys 1706, a speaker 1707, and the like. With the operation key 1706, pages can be turned. Note that a keyboard, a pointing device, or the like may also be provided on the surface of the housing, on which the display portion is provided. Furthermore, an external connection terminal (e.g., an earphone terminal, a USB terminal, or a terminal connectable to a variety of cables such as a USB cable), a recording medium insertion portion, and the like may be provided on the back surface or the side surface of the housing. Moreover, the electronic book reader in FIG. 13A may have a function of an electronic dictionary.

Figure 13B:
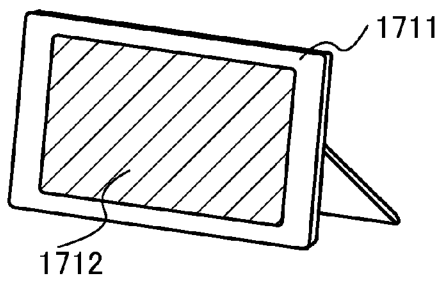

FIG. 13B illustrates an example of a digital photo frame. For example, in a digital photo frame in FIG. 13B, a display portion 1712 is incorporated in a housing 1711. The display portion 1712 can display a variety of images. For example, the display portion 1712 can display data of an image taken with a digital camera or the like and function as a normal photo frame.

Note that the digital photo frame in FIG. 13B is provided with an operation portion, an external connection terminal (a USB terminal, a terminal connectable to a variety of cables such as a USB cable, or the like), a recording medium insertion portion, and the like. Although these components may be provided on the same surface as the display portion, it is preferable to provide them on the side surface or the back surface for design aesthetics. For example, a memory storing data of an image taken with a digital camera is inserted in the recording medium insertion portion of the digital photo frame and the data is loaded, whereby the image can be displayed on the display portion 1712.

Figure 13C:
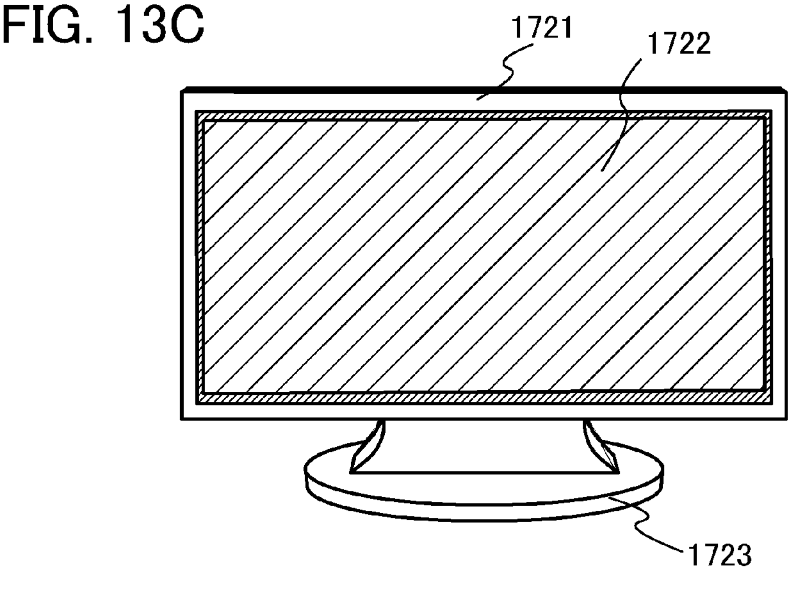

FIG. 13C illustrates an example of a television set including a liquid crystal display device. In the television set in FIG. 13C, a display portion 1722 is incorporated in a housing 1721. The display portion 1722 can display an image. Here, the housing 1721 is supported by a stand 1723. The liquid crystal display device described in any of the above embodiments can be used for the display portion 1722.

The television set in FIG. 13C can be operated with an operation switch of the housing 1721 or a separate remote controller. Channels and volume can be controlled with an operation key of the remote controller so that an image displayed on the display portion 1722 can be controlled. Further, the remote controller may be provided with a display portion for displaying data output from the remote controller.

Figure 13D:
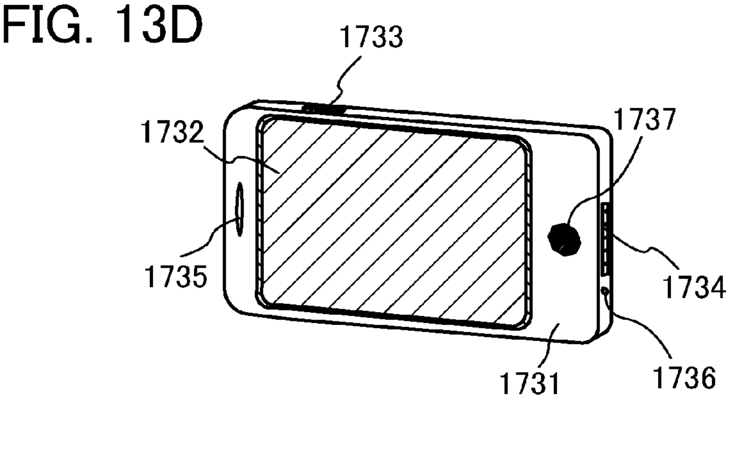

FIG. 13D illustrates an example of a mobile phone including a liquid crystal display device. The mobile phone illustrated in FIG. 13D is provided with a display portion 1732 incorporated in a housing 1731, an operation button 1733, an operation button 1737, an external connection port 1734, a speaker 1735, a microphone 1736, and the like.

The display portion 1732 of the mobile phone in FIG. 13D is a touchscreen. When the display portion 1732 is touched with a finger or the like, contents displayed on the display portion 1732 can be controlled. Further, operations such as making calls and composing mails can be performed by touching the display portion 1732 with a finger or the like.

This embodiment can be implemented in appropriate combination with any of the structures described in the other embodiments.

EXPLANATION OF REFERENCE

10: pixel portion, 11: scan line driver circuit, 12: signal line driver circuit, 15: pixel, 16: light source, 101: backlight portion, 102: display panel, 103: polarizing plate, 104: polarizing plate, 106: diffuser plate, 107: pixel portion, 108: scan line driver circuit, 109: signal line driver circuit, 111: shift register, 112: shift register, 113: shift register, 120: shift register, 121: transistor, 122: transistor, 123: transistor, 131: scan line, 132: scan line, 133: scan line, 141: signal line, 142: signal line, 143: signal line, 151: transistor, 152: transistor, 153: transistor, 154: capacitor, 155: liquid crystal element, 161: FPC, 162: external substrate, 181: display panel, 182: backlight portion, 183: video signal selection circuit, 184: control circuit, 185: sequence determination circuit, 186: random number generation circuit, 187: pixel portion, 188: scan line driver circuit, 189: signal line driver circuit, 190: pixel, 191: light source, 192: backlight control circuit, 193: memory circuit, 400: substrate, 401: gate electrode layer, 402: gate insulating layer, 403: semiconductor layer, 407: insulating film, 409: protective insulating layer, 410: transistor, 420: transistor, 427: insulating film, 430: transistor, 437: insulating layer, 440: transistor, 700: alternate long and short dashed line, 701: alternate long and short dashed line, 702: alternate long and short dashed line, 703: alternate long and short dashed line, 1001: alternate long and short dashed line, 1002: alternate long and short dashed line, 1003: alternate long and short dashed line, 105R: light source, 1700: housing, 1701: housing, 1702: display portion, 1703: display portion, 1704: hinge, 1705: power input terminal, 1706: operation key, 1707: speaker, 1711: housing, 1712: display portion, 1721: housing, 1722: display portion, 1723: stand, 1731: housing, 1732: display portion, 1733: operation button, 1734: external connection port, 1735: speaker, 1736: microphone, 1737: operation button, 405*a*: source electrode layer, 405*b*: drain electrode layer, 436*a*: wiring layer, 436*b*: wiring layer, 1901*a*: source electrode layer, 1901*b*: drain electrode layer, 1903: gate electrode layer, 1904: capacitor wiring layer, 1905: transistor, 1912: gate insulating layer, 1915: capacitor, 1907: insulating film, 1909: interlayer film, 1918: first substrate, 1910: transparent electrode layer, 1919: second substrate, 1920: transparent electrode layer, 1917: liquid crystal layer, 1911: light-blocking layer, 1913: semiconductor layer, 6110: transfer substrate, 6111: adhesive layer, 6116: layer to be separated, 6200: formation substrate, 6201: separation layer, 6202: temporary supporting substrate, 6203: adhesive for separation, 6206: metal plate, 6207: barrier layer, 6210: wiring layer, 6211: wiring layer, and 6212: light-transmitting region.

This application is based on Japanese Patent Application serial no. 2010-144883 filed with the Japan Patent Office on Jun. 25, 2010 and Japanese Patent Application serial no. 2010-145143 filed with the Japan Patent Office on Jun. 25, 2010, the entire contents of which are hereby incorporated by reference.

The invention claimed is:

1. A display device comprising:
a pixel comprising:
a first transistor comprising a first gate, a first terminal, and a second terminal; and
a pixel electrode electrically connected to the second terminal;
a first wiring electrically connected to the first gate;
a second wiring electrically connected to the first terminal;
a scan line driver circuit electrically connected to the first wiring;
a backlight portion comprising:
a first light source configured to emit first light exhibiting a first color;
a second light source configured to emit second light concurrently with the first light at one sampling period in one frame period, the second light exhibiting a second color which is different from the first color; and
a backlight control circuit electrically connected to the first light source and the second light source;
a sequence determination circuit electrically connected to the backlight portion;
a video signal selection circuit electrically connected to and configured to be controlled by the sequence determination circuit; and
a random number generation circuit electrically connected to the sequence determination circuit,
wherein the video signal selection circuit comprises a memory circuit.

2. The display device according to claim 1, wherein the random number generation circuit comprises a chaotic random number generation portion.

3. The display device according to claim 1, wherein the random number generation circuit is configured to generate a random number signal.

4. The display device according to claim 3, wherein the backlight control circuit is configured to be controlled in accordance with the random number signal.

5. The display device according to claim 1, further comprising a liquid crystal layer over the pixel electrode.

6. The display device according to claim 1, further comprising a light-blocking layer over the first transistor.

7. The display device according to claim 1,
wherein the sequence determination circuit and the random number generation circuit are formed over a substrate, and
wherein the sequence determination circuit is electrically connected to the backlight portion through a flexible printed circuit.

8. An electronic appliance comprising the display device according to claim 1, wherein the electronic appliance is one selected from the group consisting of a television set, a monitor of a computer, a camera, a digital photo frame, a mobile phone handset, a portable game machine, a portable information terminal, an audio reproducing device, and a large-sized game machine.

9. The display device according to claim 1,
wherein the pixel comprises a second transistor comprising a second gate, a third terminal, and a fourth terminal,
wherein the display device comprises:
a third wiring electrically connected to the second gate; and
a fourth wiring electrically connected to the third terminal,
wherein the pixel electrode is electrically connected to the fourth terminal, and
wherein the scan line driver circuit is electrically connected to the third wiring.

10. The display device according to claim 9,
wherein the scan line driver circuit comprises a first shift register and a second shift register,
wherein the first shift register is electrically connected to the first wiring, and
wherein the second shift register is electrically connected to the third wiring.

11. The display device according to claim 1, wherein the memory circuit is configured with a dynamic random access memory (DRAM) or a static random access memory (SRAM).

12. A display device comprising:
a pixel comprising:
a first transistor comprising a first gate, a first terminal, and a second terminal; and
a pixel electrode electrically connected to the second terminal;
a first wiring electrically connected to the first gate;
a second wiring electrically connected to the first terminal;
a scan line driver circuit electrically connected to the first wiring;
a signal line driver circuit electrically connected to the second wiring;
a video signal selection circuit electrically connected to the signal line driver circuit;
a backlight portion comprising:
a first light source configured to emit first light exhibiting a first color;
a second light source configured to emit second light concurrently with the first light at one sampling period in one frame period, the second light exhibiting a second color which is different from the first color; and
a backlight control circuit electrically connected to the first light source and the second light source;
a sequence determination circuit electrically connected to the video signal selection circuit and the backlight portion; and
a random number generation circuit electrically connected to the sequence determination circuit,
wherein the video signal selection circuit is configured to be controlled by the sequence determination circuit, and
wherein the video signal selection circuit comprises a memory circuit.

13. The display device according to claim 12, wherein the random number generation circuit comprises a chaotic random number generation portion.

14. The display device according to claim 12, wherein the random number generation circuit is configured to generate a random number signal.

15. The display device according to claim 14, wherein the backlight control circuit is configured to be controlled in accordance with the random number signal.

16. The display device according to claim 14, wherein a video signal is supplied from the video signal selection circuit to the signal line driver circuit in accordance with the random number signal.

17. The display device according to claim 12, further comprising a liquid crystal layer over the pixel electrode.

18. The display device according to claim 12, further comprising a light-blocking layer over the first transistor.

19. The display device according to claim 12, wherein the video signal selection circuit, the sequence determination circuit, and the random number generation circuit are formed over a substrate, wherein the sequence determination circuit is electrically connected to the backlight portion through a first flexible printed circuit, and wherein the video signal selection circuit is electrically connected to the signal line driver circuit through a second flexible printed circuit.

20. An electronic appliance comprising the display device according to claim 12, wherein the electronic appliance is one selected from the group consisting of a television set, a monitor of a computer, a camera, a digital photo frame, a mobile phone handset, a portable game machine, a portable information terminal, an audio reproducing device, and a large-sized game machine.

21. The display device according to claim 12, wherein the pixel comprises a second transistor comprising a second gate, a third terminal, and a fourth terminal, wherein the display device comprises:

a third wiring electrically connected to the second gate; and a fourth wiring electrically connected to the third terminal, wherein the pixel electrode is electrically connected to the fourth terminal, wherein the scan line driver circuit is electrically connected to the third wiring, and wherein the signal line driver circuit is electrically connected to the fourth wiring.

22. The display device according to claim 21, wherein the scan line driver circuit comprises a first shift register and a second shift register, wherein the first shift register is electrically connected to the first wiring, and wherein the second shift register is electrically connected to the third wiring.

23. The display device according to claim 12, wherein the memory circuit is configured with a dynamic random access memory (DRAM) or a static random access memory (SRAM).

24. A display device comprising:

a first pixel region;

a second pixel region;

a signal line driver circuit configured to input a first video signal to a first pixel in the first pixel region and a second video signal to a second pixel in the second pixel region concurrently;

a scan line driver circuit electrically connected to the first pixel through a first wiring and to the second pixel through a second wiring;

a backlight portion comprising:

light sources of plural colors divided into a first light source region where light is emitted in response to input of the first video signal to the first pixel region and a second light source region where light is emitted in response to input of the second video signal to the second pixel region; and a backlight control circuit that controls the light sources of the plural colors so that the light sources of the plural colors in the first light source region and the second light source region concurrently emit lights of different colors from each other at one sampling period in one frame period;

a video signal selection circuit electrically connected to the signal line driver circuit;

a sequence determination circuit electrically connected to the video signal selection circuit and the backlight portion; and a random number generation circuit electrically connected to the sequence determination circuit, wherein the video signal selection circuit is configured to be controlled by the sequence determination circuit, and wherein the video signal selection circuit comprises a memory circuit.

25. The display device according to claim 24, wherein the random number generation circuit comprises a chaotic random number generation portion.

26. The display device according to claim 24, wherein the random number generation circuit is configured to generate a random number signal.

27. The display device according to claim 26, wherein the backlight control circuit is configured to be controlled in accordance with the random number signal.

28. The display device according to claim 26, wherein a video signal is supplied from the video signal selection circuit to the signal line driver circuit in accordance with the random number signal.

29. The display device according to claim 24, wherein the scan line driver circuit comprises a first shift register and a second shift register, wherein the first shift register is electrically connected to the first wiring, and wherein the second shift register is electrically connected to the second wiring.

30. The display device according to claim 24, wherein the video signal selection circuit, the sequence determination circuit, and the random number generation circuit are formed over a substrate, wherein the sequence determination circuit is electrically connected to the backlight portion through a first flexible printed circuit, and wherein the video signal selection circuit is electrically connected to the signal line driver circuit through a second flexible printed circuit.

31. An electronic appliance comprising the display device according to claim 24, wherein the electronic appliance is one selected from the group consisting of a television set, a monitor of a computer, a camera, a digital photo frame, a mobile phone handset, a portable game machine, a portable information terminal, an audio reproducing device, and a large-sized game machine.

32. The display device according to claim 24, wherein the memory circuit is configured with a dynamic random access memory (DRAM) or a static random access memory (SRAM).

* * * * *